(12) United States Patent
Lu

(10) Patent No.: US 9,959,248 B1
(45) Date of Patent: *May 1, 2018

(54) ITERATIVE SIMPLE LINEAR REGRESSION COEFFICIENT CALCULATION FOR BIG DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/981,112

(22) Filed: Dec. 28, 2015

Related U.S. Application Data

(60) Provisional application No. 62/126,445, filed on Feb. 28, 2015.

(51) Int. Cl.
*G06F 1/02* (2006.01)
*G06F 17/17* (2006.01)
*G06F 1/32* (2006.01)

(52) U.S. Cl.
CPC .......... *G06F 17/17* (2013.01); *G06F 1/32* (2013.01)

(58) Field of Classification Search
CPC .................. G06F 17/17; G06F 1/32
USPC ........................................ 708/274
See application file for complete search history.

(56) References Cited

U.S. PATENT DOCUMENTS

| 6,928,434 | B1* | 8/2005 | Choi ............... G06Q 20/207 |
| 7,747,413 | B2 | 6/2010 | Ramsey et al. |
| 7,840,377 | B2 | 11/2010 | Ramsey et al. |
| 9,069,726 | B2 | 6/2015 | Lu |
| 2002/0091707 | A1* | 7/2002 | Keller ............. G06F 17/3061 |
| 2003/0176931 | A1* | 9/2003 | Pednault ........ G06F 17/30539 700/31 |
| 2006/0074611 | A1* | 4/2006 | Wong .............. G03F 7/70633 703/2 |
| 2008/0201117 | A1* | 8/2008 | Wong .............. G06F 17/5009 703/2 |
| 2014/0164456 | A1 | 6/2014 | Lu |

FOREIGN PATENT DOCUMENTS

WO  WO-2014093540 A2  6/2014
WO  WO-2014093540 A3  9/2014

* cited by examiner

*Primary Examiner* — Tan V. Mai

(57) ABSTRACT

Methods, systems, and computing system program products for iteratively calculating Simple Linear Regression (SLR) coefficients for Big Data, including iteratively calculating one or more components of SLR coefficients for a modified computation set based on one or more components of SLR coefficients calculated for a pre-modified computation set and then calculating the SLR coefficients for the modified computation set based on the iteratively calculated components. Iteratively calculating SLR coefficients avoids visiting all data elements in the modified computation set and performing redundant computations thereby increasing calculation efficiency, saving computing resources and reducing computing system's power consumption.

20 Claims, 26 Drawing Sheets

The Definitions of Simple Linear Regression Coefficients:

Suppose computation set $XY$ composes of $n$ pairs of data elements: $XY = \{(x_i, y_i) | i = 1, \ldots, n\}$, where data elements $x_1, x_2, x_3, x_4, \ldots\ldots, x_n$ are observed data from a predictor variable $X$ and data elements $y_1, y_2, y_3, y_4, \ldots\ldots, y_n$ are observed data from a response variable $Y$, simple linear regression coefficients for $XY$ need to be calculated.

A simple linear regression model is defined as $$Y = \beta 0 + \beta 1 X + \varepsilon$$

The relationship between Y and X can be described by a fitted regression line $\hat{Y} = b0 + b1X$. The estimates $b1$ and $b0$ are called simple linear regression coefficients and can be calculated using following equations:

$$b1 = \frac{\sum_1^n (x_i - \bar{x}_k)(y_i - \bar{y}_k)}{\sum_1^n (x_i - \bar{x}_k)^2} \qquad \frown\!\smile 401$$

$$b0 = \bar{y}_k - b1 \bar{x}_k \qquad \frown\!\smile 402$$

Define the sums of $X$ with size $n$ and $Y$ with size $n$ in the $k^{th}$ iteration respectively as below:

$$XS_k = x_1 + x_2 + x_3 + \cdots + x_n = \sum_1^n x_i \qquad \frown\!\smile 403$$

$$YS_k = y_1 + y_2 + y_3 + \cdots + y_n = \sum_1^n y_i \qquad \frown\!\smile 404$$

Define the means of $X$ with size $n$ and $Y$ with size $n$ in the $k^{th}$ iteration respectively as below:

$$\bar{x}_k = \frac{(x_1 + x_2 + x_3 + \cdots + x_n)}{n} = \frac{\sum_1^n x_i}{n} \qquad \frown\!\smile 405$$

$$\bar{y}_k = \frac{(y_1 + y_2 + y_3 + \cdots + y_n)}{n} = \frac{\sum_1^n y_i}{n} \qquad \frown\!\smile 406$$

Fig. 4A

The simple linear regression coefficients for $X$ with size $n$ and $Y$ with size $n$ in the $k^{th}$ iteration are defined as:

$$b1_k = \frac{\sum_1^n(x_i-\bar{x}_k)(y_i-\bar{y}_k)}{\sum_1^n(x_i-\bar{x}_k)^2} \qquad \sim\!\_407$$

$$b0_k = \bar{y}_k - b1_k\bar{x}_k \qquad \sim\!\_408$$

Suppose $b1$ and $b0$ in the simple linear regression equation for the computation set $XY$ with a fixed size $n$ have already been calculated, and they need to be calculated again after an existing pair of data elements $(x_r, y_r)(0 \le r \le n)$ in $XY$ is removed and a new pair of data elements $(x_a, y_a)$ is added.

Define the sums and means of $X$ with size $n$ and $Y$ with size $n$ in the $k+1^{th}$ iteration respectively as below:

$$XS_{k+1} = x_1 + x_2 + x_3 + \cdots + x_n + x_a - x_r = \sum_1^n x_i + x_a - x_r \qquad \sim\!\_409$$

$$YS_{k+1} = y_1 + y_2 + y_3 + \cdots + y_n + y_a - y_r = \sum_1^n y_i + y_a - y_r \qquad \sim\!\_410$$

$$\bar{x}_{k+1} = \frac{(x_1+x_2+\cdots+x_n+x_a-x_r)}{n} = \frac{\sum_1^n x_i + x_a - x_r}{n} \qquad \sim\!\_411$$

$$\bar{y}_{k+1} = \frac{(y_1+y_2+\cdots+y_n+y_a-y_r)}{n} = \frac{\sum_1^n y_i + y_a - y_r}{n} \qquad \sim\!\_412$$

The simple linear regression coefficients of the modified $X$ with size $n$ and modified $Y$ with size $n$ in the $k+1^{th}$ iteration are defined as:

$$b1_{k+1} = \frac{\sum_1^n(x_i-\bar{x}_{k+1})(y_i-\bar{y}_{k+1})+(x_a-\bar{x}_{k+1})(y_a-\bar{y}_{k+1})-(x_r-\bar{x}_{k+1})(y_r-\bar{y}_{k+1})}{\sum_1^n(x_i-\bar{x}_{k+1})^2+(x_a-\bar{x}_{k+1})^2-(x_r-\bar{x}_{k+1})^2} \qquad \sim\!\_413$$

$$b0_{k+1} = \bar{y}_{k+1} - b1_{k+1}\bar{x}_{k+1} \qquad \sim\!\_414$$

Fig. 4A Cont'd

Some Example Components of Simple Linear Regression Coefficients:

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $XSS_k = \sum_1^n x_i^2$
- $XV_k = \sum_1^n x_i^2 - n\bar{x}_k^2 = XSS_k - \frac{XS_k^2}{n} = XSS_k - n\bar{x}_k^2$
- $SSDX_k = \sum_1^n (x_i - \frac{XS_k}{n})^2 = \sum_1^n (x_i - \bar{x}_k)^2$
- $SDXY_k = \sum_1^n (x_i - \bar{x}_k)(y_i - \bar{y}_k) = \sum_1^n (x_i - \frac{XS_k}{n})(y_i - \bar{y}_k) = \sum_1^n (x_i - \bar{x}_k)(y_i - \frac{YS_k}{n}) = \sum_1^n (x_i - \frac{XS_k}{n})(y_i - \frac{YS_k}{n})$
- $SXY_k = \sum_1^n x_i y_i$
- $x\sigma_k^2 = \frac{\sum_1^n x_i^2}{n} - \bar{x}_k^2 = \frac{\sum_1^n x_i^2}{n} - \left(\frac{XS_k}{n}\right)^2$
- $b1_k = \frac{\sum_1^n (x_i - \bar{x}_k)(y_i - \bar{y}_k)}{\sum_1^n (x_i - \bar{x}_k)^2} = \frac{\sum_1^n (x_i - \frac{XS_k}{n})(y_i - \bar{y}_k)}{\sum_1^n (x_i - \frac{XS_k}{n})^2} = \frac{\sum_1^n (x_i - \bar{x}_k)(y_i - \frac{YS_k}{n})}{\sum_1^n (x_i - \bar{x}_k)^2} = \frac{\sum_1^n (x_i - \frac{XS_k}{n})(y_i - \frac{YS_k}{n})}{\sum_1^n (x_i - \frac{XS_k}{n})^2}$
- $b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$ Basic Iterative Component Calculation Equations:

The sum and/or mean of the data within the a computation set will be used by several examples of iterative algorithms described in the following sections, so put its calculation here instead of in each algorithms.

According to the definitions of $XS_{k+1}, YS_{k+1}, \bar{x}_{k+1}$ and $\bar{y}_{k+1}$, they can be easily calculated in an iterative way:

$XS_{k+1} = XS_k + x_a - x_r$ ⌢⌣415

$YS_{k+1} = YS_k + y_a - y_r$ ⌢⌣416

$\bar{x}_{k+1} = \bar{x}_k + \frac{x_a - x_r}{n}$ ⌢⌣417

$\bar{y}_{k+1} = \bar{y}_k + \frac{y_a - y_r}{n}$ ⌢⌣418

Fig. 4B

Iterative Algorithm 1:

Simple linear regression coefficients can be iteratively calculated based on the components $XS_k$ or $\bar{x}_k$, $YS_k$ or $\bar{y}_k$, $XS_{k+1}$ or $\bar{x}_{k+1}$ and $YS_{k+1}$ or $\bar{y}_{k+1}$ defined in Figure 4A and Figure 4B and components $SXY_{k+1}$, and $XV_{k+1}$ defined below.

$XSS_k = \sum_1^n x_i^2$ ⏜419

$XSS_{k+1} = \sum_1^n x_i^2 + x_a^2 - x_r^2$ ⏜420

$XSS_{k+1}$ can be easily calculated in an iterative way:

$XSS_{k+1} = XSS_k + x_a^2 - x_r^2$ ⏜421

$XV_k = XSS_k - \frac{XS_k^2}{n} = XSS_k - n\bar{x}_k^2$ ⏜422

$XV_{k+1} = XSS_{k+1} - \frac{XS_{k+1}^2}{n} = XSS_{k+1} - n\bar{x}_{k+1}^2$ ⏜423

$SXY_k = \sum_1^n x_i y_i$ ⏜424

$SXY_{k+1} = \sum_1^n x_i y_i + x_a y_a - x_r y_r$ ⏜425

$SXY_{k+1}$ can be calculated in an iterative way:

$SXY_{k+1} = SXY_k + x_a y_a - x_r y_r$ ⏜426

Once $XS_{k+1}$ or $\bar{x}_{k+1}$, $YS_{k+1}$ or $\bar{y}_{k+1}$, $SXY_{k+1}$, and $XV_{k+1}$ are calculated, then simple linear regression coefficients can be calculated by $b1_{k+1} = \frac{SXY_{k+1} - n \cdot \bar{x}_{k+1} \cdot \bar{y}_{k+1}}{XV_{k+1}} = \frac{SXY_{k+1} - XS_{k+1} \cdot \bar{y}_{k+1}}{XV_{k+1}} = \frac{SXY_{k+1} - \bar{x}_{k+1} \cdot YS_{k+1}}{XV_{k+1}} = \frac{SXY_{k+1} - XS_{k+1} \cdot YS_{k+1}/n}{XV_{k+1}}$

⏜427

$b0_{k+1} = \frac{YS_{k+1}}{n} - b1_{k+1} \bar{x}_{k+1} = \bar{y}_{k+1} - b1_{k+1} \frac{XS_{k+1}}{n} = \frac{(YS_{k+1} - b1_{k+1} XS_{k+1})}{n} = \bar{y}_{k+1} - b1_{k+1} \bar{x}_{k+1}$

Iterative Algorithm 2:

Simple linear regression coefficients can be calculated based on components $XS_{k+1}$ or $\bar{x}_{k+1}$ and $YS_{k+1}$ or $\bar{y}_{k+1}$ defined in Figure 4B and $SSDX_{k+1}$, $SDXY_{k+1}$ defined below.

$SSDX_k = \sum_1^n (x_i - \bar{x}_k)^2$ ⌒⌒429

$SSDX_{k+1} = \sum_1^n (x_i - \bar{x}_{k+1})^2 + (x_a - \bar{x}_{k+1})^2 - (x_r - \bar{x}_{k+1})^2$ ⌒⌒430

$SSDX_{k+1}$ can be calculated in an iterative way:

$SSDX_{k+1} = SSDX_k + (x_a - x_r)((x_r + x_a) - (XS_k + XS_{k+1})/n) = SSDX_k + (x_a - x_r)((x_r + x_a) - (\bar{x}_k + \bar{x}_{k+1}))$ ⌒⌒431

$SDXY_k = \sum_1^n (x_i - \bar{x}_k)(y_i - \bar{y}_k)$ ⌒⌒432

$SDXY_{k+1} = \sum_1^n (x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1})$
⌒⌒433

$SDXY_{k+1}$ can be calculated in an iterative way by using $XS_{k+1}$ or $\bar{x}_{k+1}$, $YS_{k+1}$ or $\bar{y}_{k+1}$, $SDXY_k$:

$SDXY_{k+1} = SDXY_k + (y_a - YS_k/n)(x_a - x_r) + (y_a - y_r)(x_r - \bar{x}_{k+1}) = SDXY_k + (y_a - \bar{y}_k)(x_a - x_r) + (y_a - y_r)(x_r - XS_{k+1}/n) = SDXY_k + (y_a - YS_k/n)(x_a - x_r) + (y_a - y_r)(x_r - XS_{k+1}/n) = SDXY_k + (y_a - \bar{y}_k)(x_a - x_r) + (y_a - y_r)(x_r - \bar{x}_{k+1}) = SDXY_k + (x_a - XS_k/n)(y_a - y_r) + (x_a - x_r)(y_r - \bar{y}_{k+1}) = SDXY_k + (x_a - \bar{x}_k)(y_a - y_r) + (x_a - x_r)(y_r - YS_{k+1}/n) = SDXY_k + (x_a - XS_k/n)(y_a - y_r) + (x_a - x_r)(y_r - YS_{k+1}/n) = SDXY_k + (x_a - \bar{x}_k)(y_a - y_r) + (x_a - x_r)(y_r - \bar{y}_{k+1})$
⌒⌒434

Once $SSDX_{k+1}$ and $SDXY_{k+1}$ is calculated, then $b1_{k+1} = \frac{SDXY_{k+1}}{SSDX_{k+1}}$ ⌒⌒435

$b0_{k+1} = \frac{YS_{k+1}}{n} - b1_{k+1}\bar{x}_{k+1} = \bar{y}_{k+1} - b1_{k+1}\frac{XS_{k+1}}{n} = \frac{(YS_{k+1} - b1_{k+1}XS_{k+1})}{n} = \bar{y}_{k+1} - b1_{k+1}\bar{x}_{k+1}$
⌒⌒436

Fig. 4D

Iterative Algorithm 3:

Simple linear regression coefficients can be calculated based on components $XS_{k+1}$ or $\bar{x}_{k+1}$ and $YS_{k+1}$ or $\bar{y}_{k+1}$ defined in Figure 4B and $XSS_{k+1}$, $SXY_{k+1}$ defined below.

$XSS_k = \sum_1^n x_i^2$ ⌢⌣437

$XSS_{k+1} = \sum_1^n x_i^2 + x_a^2 - x_r^2$ ⌢⌣438

$XSS_{k+1}$ can be easily calculated in an iterative way:

$XSS_{k+1} = XSS_k + x_a^2 - x_r^2$ ⌢⌣439

$SXY_k = \sum_1^n x_i y_i$ ⌢⌣440

$SXY_{k+1} = \sum_1^n x_i y_i + x_a y_a - x_r y_r$ ⌢⌣441

$SXY_{k+1}$ can be easily calculated in an iterative way:

$SXY_{k+1} = SXY_k + x_a y_a - x_r y_r$ ⌢⌣442

Once $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$ are calculated, then simple linear regression coefficients can be calculated by $$b1_{k+1} = \frac{SXY_{k+1} - XS_{k+1} \cdot \bar{y}_{k+1}}{XSS_{k+1} - XS_{k+1}^2/n} = \frac{SXY_{k+1} - \bar{x}_{k+1} \cdot YS_{k+1}}{XSS_{k+1} - n \cdot \bar{x}_{k+1}^2} = \frac{SXY_{k+1} - XS_{k+1} \cdot YS_{k+1}/n}{XSS_{k+1} - XS_{k+1}^2/n} = \frac{n \cdot SXY_{k+1} - XS_{k+1} \cdot YS_{k+1}}{n \cdot XSS_{k+1} - XS_{k+1}^2} = \frac{SXY_{k+1} - n \cdot \bar{x}_{k+1} \cdot \bar{y}_{k+1}}{XSS_{k+1} - n \cdot \bar{x}_{k+1}^2}$$
⌢⌣443

$$b0_{k+1} = \frac{YS_{k+1}}{n} - b1_{k+1} \bar{x}_{k+1} = \bar{y}_{k+1} - b1_{k+1} \frac{XS_{k+1}}{n} = \frac{(YS_{k+1} - b1_{k+1} XS_{k+1})}{n} = \bar{y}_{k+1} - b1_{k+1} \bar{x}_{k+1}$$

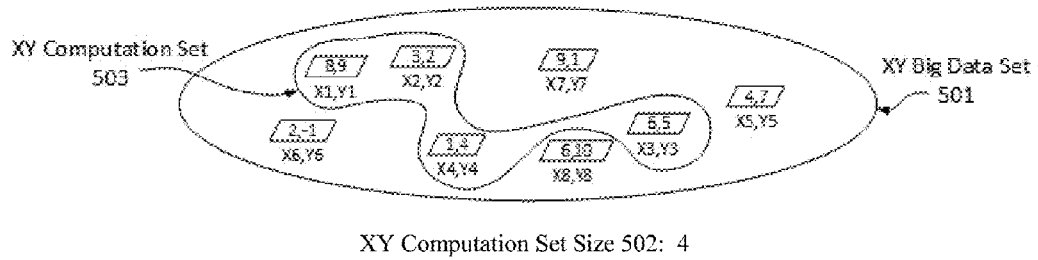

XY Computation Set Size 502: 4

<u>Calculate Linear Regression Coefficients for XY Computation Set 503</u>

Traditional Algorithm:

1. Use equations 405 and 406 to calculate the means of X variable and Y variable in XY computation set 503 respectively:

$$\bar{x}_1 = \frac{8+3+6+1}{4} = \frac{18}{4} = 4.5, \qquad \bar{y}_1 = \frac{9+2+5+4}{4} = \frac{20}{4} = 5$$

Operations in this step: 2 divisions, 6 additions

2. Calculate $\sum_1^4(x_i - \bar{x}_1)(y_i - \bar{y}_1)$ for the 1st iteration:

$\sum_1^4(x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 14 + 4.5 + 0 + 3.5 = 22$ Operations in this step: 4 multiplications, 3 additions, 8 subtractions 3. Calculate $\sum_1^4(x_i - \bar{x}_1)^2$ for the 1st iteration:

$\sum_1^4(x_i - \bar{x}_1)^2 = (8 - 4.5)^2 + (3 - 4.5)^2 + (6 - 4.5)^2 + (1 - 4.5)^2 = 29$ Operations in this step: 4 multiplications, 3 additions, 4 subtractions 4. Calculate $b1_1 = \frac{\sum_1^4(x_i-\bar{x}_1)(y_i-\bar{y}_1)}{\sum_1^4(x_i-\bar{x}_1)^2}$ for the 1st iteration:

$$b1_1 = \frac{\sum_1^4(x_i-\bar{x}_1)(y_i-\bar{y}_1)}{\sum_1^4(x_i-\bar{x}_1)^2} = \frac{22}{29} = 0.7586206896551724$$

Operations in this step: 1 division

5. Calculate $b0_1 = \bar{y}_1 - b1_1\bar{x}_1$ for the 1st iteration:

$b0_1 = \bar{y}_1 - b1_1\bar{x}_1 = 5 - 0.7586206896551724 \times 4.5 = 5 - 3.4137931034482759 = 1.5862068965517241$ Operations in this step: 1 multiplication, 1 subtraction There are a total of 3 divisions, 9 multiplications, 12 additions and 13 subtractions.

Fig. 5A

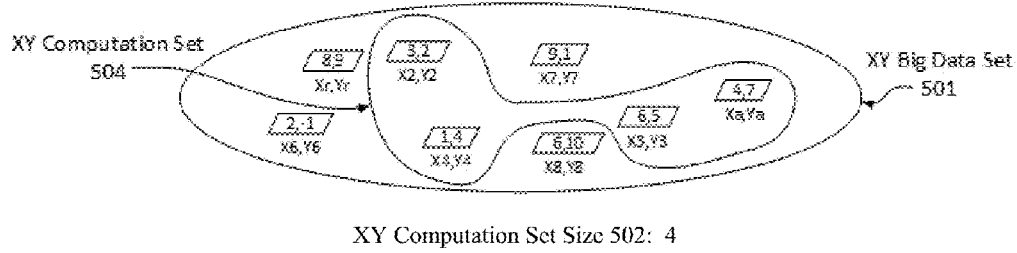

XY Computation Set Size 502: 4

<u>Calculate Linear Regression Coefficients for *XY* Computation Set 504</u>

Traditional Algorithm:

1. Use equations 405 and 406 to calculate the means of X variable and Y variable in XY computation set 504 respectively:

$$\bar{x}_2 = \frac{3+6+1+4}{4} = \frac{14}{4} = 3.5 \qquad \bar{y}_2 = \frac{2+5+4+7}{4} = \frac{18}{4} = 4.5$$

Operations in this step: 2 divisions, 6 additions

2. Calculate $\sum_2^4 (x_i - \bar{x}_2)(y_i - \bar{y}_2) + (x_a - \bar{x}_2)(y_a - \bar{y}_2)$ $\sum_2^4 (x_i - \bar{x}_2)(y_i - \bar{y}_2) + (x_a - \bar{x}_2)(y_a - \bar{y}_2) = (3 - 3.5)(2 - 4.5) + (6 - 3.5)(5 - 4.5) + (1 - 3.5)(4 - 4.5) + (4 - 3.5)(7 - 4.5) = 1.25 + 1.25 + 1.25 + 1.25 = 5$ Operations in this step: 4 multiplications, 3 additions, 8 subtractions 3. Calculate $\sum_2^4 (x_i - \bar{x}_2)^2 + (x_a - \bar{x}_2)^2$ $\sum_2^4 (x_i - \bar{x}_2)^2 + (x_a - \bar{x}_2)^2 = (3 - 3.5)^2 + (6 - 3.5)^2 + (1 - 3.5)^2 + (4 - 3.5)^2 = 13$ Operations in this step: 4 multiplications, 3 additions, 4 subtractions 4. Calculate $b1_2 = \frac{\sum_2^4 (x_i - \bar{x}_2)(y_i - \bar{y}_2) + (x_a - \bar{x}_2)(y_a - \bar{y}_2)}{\sum_2^4 (x_i - \bar{x}_2)^2 + (x_a - \bar{x}_2)^2}$ $b1_2 = \frac{\sum_2^4 (x_i - \bar{x}_2)(y_i - \bar{y}_2) + (x_a - \bar{x}_2)(y_a - \bar{y}_2)}{\sum_2^4 (x_i - \bar{x}_2)^2 + (x_a - \bar{x}_2)^2} = \frac{5}{13} = 0.3846153846153846$ Operations in this step: 1 division 6. Calculate $b0_2 = \bar{y}_2 - b1_2 \bar{x}_2$ for the 2$^{nd}$ iteration:

$b0_2 = \bar{y}_2 - b1_2 \bar{x}_2 = 4.5 - 0.3846153846153846 \times 3.5 = 4.5 - 1.3461538461538461 = 3.1538461538461539$ Operations in this step: 1 multiplication, 1 subtraction There are a total of 3 divisions, 9 multiplications, 12 additions and 13 subtractions.

Fig. 5A Cont'd 1

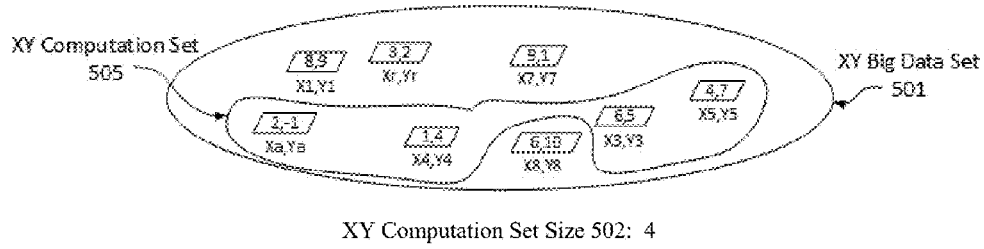

XY Computation Set Size 502: 4

Calculate Linear Regression Coefficients for *XY* Computation Set 505

Traditional Algorithm:

1. Use equation 405 and 406 to calculate the means of X variable and Y variable in XY computation set 505 respectively:

$$\bar{x}_3 = \frac{6+1+4+2}{4} = \frac{13}{4} = 3.25 \qquad \bar{y}_3 = \frac{5+4+7+(-1)}{4} = \frac{15}{4} = 3.75$$

Operations in this step: 2 divisions, 6 additions

2. Calculate $\sum_3^5 (x_i - \bar{x}_3)(y_i - \bar{y}_3) + (x_a - \bar{x}_3)(y_a - \bar{y}_3)$ $\sum_3^5 (x_i - \bar{x}_3)(y_i - \bar{y}_3) + (x_a - \bar{x}_3)(y_a - \bar{y}_3) = (6 - 3.25)(5 - 3.75) + (1 - 3.25)(4 - 3.75) + (4 - 3.25)(7 - 3.75) + (2 - 3.25)(-1 - 3.75) = 3.4375 - 0.5625 + 2.4375 + 5.9375 = 11.25$ Operations in this step: 4 multiplications, 3 additions, 8 subtractions 3. Calculate $\sum_3^5 (x_i - \bar{x}_3)^2 + (x_a - \bar{x}_3)^2$ $\sum_3^5 (x_i - \bar{x}_3)^2 + (x_a - \bar{x}_3)^2 = (6 - 3.25)^2 + (1 - 3.25)^2 + (4 - 3.25)^2 + (2 - 3.25)^2 = 14.75$ Operations in this step: 4 multiplications, 3 additions, 4 subtractions 4. Calculate $b1_3 = \frac{\sum_3^5(x_i-\bar{x}_3)(y_i-\bar{y}_3)+(x_a-\bar{x}_3)(y_a-\bar{y}_3)}{\sum_3^5(x_i-\bar{x}_3)^2+(x_a-\bar{x}_3)^2}$ $b1_3 = \frac{\sum_3^5(x_i-\bar{x}_3)(y_i-\bar{y}_3)+(x_a-\bar{x}_3)(y_a-\bar{y}_3)}{\sum_3^5(x_i-\bar{x}_3)^2+(x_a-\bar{x}_3)^2} = \frac{11.25}{14.75} = 0.7627118644067797$ Operations in this step: 1 division 7. Calculate $b0_3 = \bar{y}_3 - b1_3 \bar{x}_3$ for the 3rd iteration:

$b0_3 = \bar{y}_3 - b1_3 \bar{x}_3 = 3.75 - 0.7627118644067797 \times 3.25 = 3.75 - 2.478813559322034025 = 1.271186440677965975$ Operations in this step: 1 multiplication, 1 subtraction There are a total of 3 divisions, 9 multiplications, 12 additions and 13 subtractions.

For number of *n* pairs of data elements, traditional algorithms typically use 3 divisions, 2*n*+*1* multiplications, 4(*n*-1) additions and 3*n*+*1* subtractions when calculating simple linear regression coefficients for a computation set composed of *n* pairs of data elements without optimization.

Fig. 5A Cont'd 2

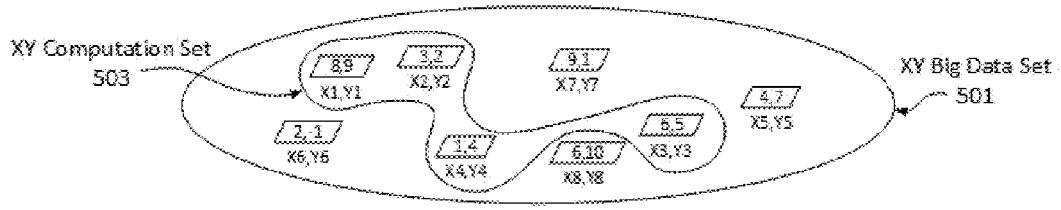

XY Computation Set Size 502: 4

Calculate Linear Regression Coefficients for XY Computation Set 503

Iterative Algorithm 1:

1. Use equations 405 and 406 to calculate the mean of X variable and Y variable in XY computation set 503 respectively:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in this step: 2 divisions, 6 additions

2. Use equations 415 and 420 to calculate $XSS_1$ $$XSS_1 = \sum_1^4 x_i^2 = 8^2 + 3^2 + 6^2 + 1^2 = 110$$

Operations in this step: 4 multiplications, 3 additions

3. Calculate $\sum_1^4 (x_i - \bar{x}_1)(y_i - \bar{y}_1)$ $$\sum_1^4 (x_i - \bar{x}_1)(y_i - \bar{y}_1) = 14 + 4.5 + 0 + 3.5 = 22$$

Operations in this step: 4 multiplications, 3 additions, 8 subtractions

4. Calculate $\sum_1^4 (x_i - \bar{x}_1)^2$ $$\sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

5. Use equation 424 to calculate $SXY_1$ $$SXY_1 = \sum_1^4 x_i y_i = 8 \times 9 + 3 \times 2 + 6 \times 5 + 1 \times 4 = 72 + 6 + 30 + 4 = 112$$

Operations in this step: 4 multiplications, 3 additions

6. Use equation 407 to calculate $b1_1$ and equation 408 to calculate $b0_1$ for the 1st iteration:

$$b1_1 = \frac{\sum_1^4 (x_i - \bar{x}_1)(y_i - \bar{y}_1)}{\sum_1^4 (x_i - \bar{x}_1)^2} = \frac{22}{29} = 0.7586206896551724$$

$$b0_1 = \bar{y}_1 - b1_1 \bar{x}_1 = 5 - 0.7586206896551724 \times 4.5 = 1.5862068965517241$$

Operations in this step: 1 division, 1 multiplication, 1 subtraction

There are a total of 3 divisions, 17 multiplications, 18 additions and 13 subtractions.

Fig. 5B

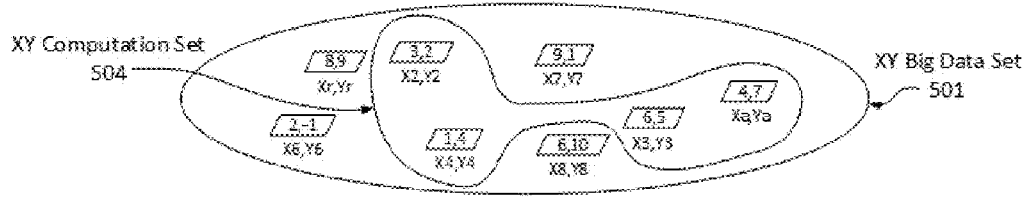

XY Computation Set Size 502: 4

Calculate Linear Regression Coefficients for XY Computation Set 504

Iterative Algorithm 1:

1. Use equations 417 and 418 to calculate $\bar{x}_2$ and $\bar{y}_2$ respectively $$\bar{x}_2 = \bar{x}_1 + \frac{(x_a - x_r)}{4} = 4.5 + \frac{4-8}{4} = 3.5$$

$$\bar{y}_2 = \bar{y}_1 + \frac{(y_a - y_r)}{4} = 5 + \frac{(7-9)}{4} = 4.5$$

Operations in this step: 2 divisions, 2 additions, 2 subtractions

2. Use equation 421 to calculate $XSS_2$ $$XSS_2 = XSS_1 + x_a^2 - x_r^2 = 110 + 4^2 - 8^2 = 62$$

Operations in this step: 2 multiplications, 1 addition, 1 subtraction

3. Use equation 423 to calculate $XV_2$ $$XV_2 = XSS_2 - 4\bar{x}_2^2 = 62 - 4 \times 3.5^2 = 62 - 49 = 13$$

Operations in this step: 2 multiplications, 1 subtraction

4. Use equation 426 to calculate $SXY_2$ $$SXY_2 = SXY_1 + x_a y_a - x_r y_r = 112 + 4 \times 7 - 8 \times 9 = 112 + 28 - 72 = 68$$

Operations in this step: 2 multiplications, 1 addition, 1 subtraction

5. Use equation 427 to calculate $b1_2$ and equation 428 to calculate $b0_2$ $$b1_2 = \frac{SXY_2 - 4\bar{x}_2\bar{y}_2}{XV_2} = \frac{68 - 4 \times 3.5 \times 4.5}{13} = \frac{68 - 63}{13} = \frac{5}{13} = 0.3846153846153846$$

$$b0_2 = \bar{y}_2 - b1_2\bar{x}_2 = 4.5 - 0.3846153846153846 \times 3.5 = 3.1538461538461539$$

Operations in this step: 1 division, 3 multiplications, 2 subtractions

There are a total of 3 divisions, 9 multiplications, 4 additions and 7 subtractions.

Fig. 5B Cont'd 1

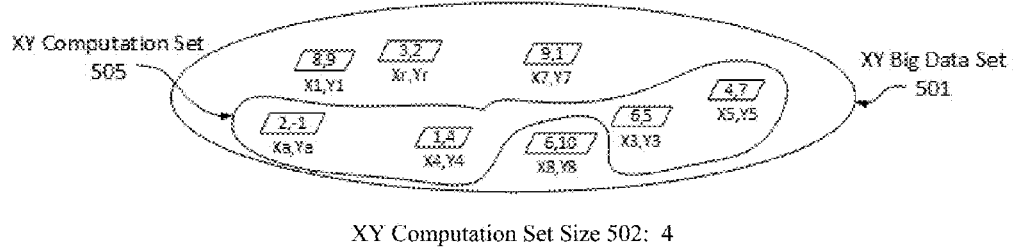

XY Computation Set Size 502: 4

Calculate Linear Regression Coefficients for XY Computation Set 505

Iterative Algorithm 1:

1. Use equations 417 and 418 to calculate $\bar{x}_3$ and $\bar{y}_3$ respectively $$\bar{x}_3 = \bar{x}_2 + \frac{(x_a - x_r)}{4} = 3.5 + \frac{(2-3)}{4} = 3.25$$

$$\bar{y}_3 = \bar{y}_2 + \frac{(y_a - y_r)}{4} = 4.5 + \frac{(-1-2)}{4} = 3.75$$

Operations in this step: 2 divisions, 2 additions, 2 subtractions

2. Use equations 421 to calculate $XSS_3$ $$XSS_3 = XSS_2 + x_a^2 - x_r^2 = 62 + 2^2 - 3^2 = 57$$

Operations in this step: 2 multiplications, 1 addition, 1 subtraction

3. Use equation 423 to calculate $XV_3$ $$XV_3 = XSS_3 - 4\bar{x}_3^2 = 57 - 4 \times 3.25^2 = 57 - 42.25 = 14.75$$

Operations in this step: 2 multiplications, 1 subtraction

4. Use equation 426 to iteratively calculate $SXY_3$ $$SXY_3 = SXY_2 + x_a y_a - x_r y_r = 68 + 2 \times (-1) - 3 \times 2 = 68 - 2 - 6 = 60$$

Operations in this step: 2 multiplications, 1 addition, 1 subtraction

5. Use equation 427 to calculate $b1_3$ and equation 428 to calculate $b0_3$ $$b1_3 = \frac{SXY_3 - 4\bar{x}_3 \bar{y}_3}{XV_3} = \frac{60 - 4 \times 3.25 \times 3.75}{14.75} = \frac{60 - 48.75}{14.75} = \frac{11.25}{14.75} = 0.7627118644067797$$

$$b0_3 = \bar{y}_3 - b1_3 \bar{x}_3 = 3.75 - 0.7627118644067797 \times 3.25 = 3.75 - 2.478813559322034025 = 1.271186440677965975$$

Operations in this step: 1 division, 3 multiplications, 2 subtractions

There are a total of 3 divisions, 9 multiplications, 4 additions and 7 subtractions.

Fig. 5B Cont'd 2

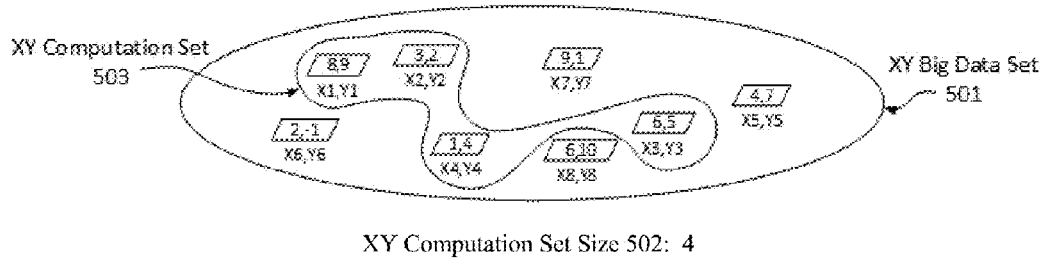

XY Computation Set Size 502: 4

Calculate Linear Regression Coefficients for XY Computation Set 503

Iterative Algorithm 2:

1. Use equations 405 and 406 to calculate the mean of X variable and Y variable in XY computation set 503 respectively:

$$\bar{x}_1 = \frac{8+3+6+1}{4} = \frac{18}{4} = 4.5$$

$$\bar{y}_1 = \frac{9+2+5+4}{4} = \frac{20}{4} = 5$$

Operations in this step: 2 divisions, 6 additions

2. Use equation 429 to calculate $SSDX_1$ for the 1st iteration:

$$SSDX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Use equation 432 to calculate $SDXY_1$ for the 1st iteration:

$$SDXY_1 = \sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 14 + 4.5 + 0 + 3.5 = 22$$

Operations in this step: 4 multiplications, 3 additions, 8 subtractions

4. Use equation 435 to calculate $b1_1$ and equation 436 to calculate $b0_1$ for the 1st iteration:

$$b1_1 = \frac{SDXY_1}{SSDX_1} = \frac{22}{29} = 0.7586206896551724$$

$$b0_1 = \bar{y}_1 - b1_1 \bar{x}_1 = 5 - 0.7586206896551724 \times 4.5 = 1.5862068965517241$$

Operations in this step: 1 division, 1 multiplication, 1 subtraction

There are a total of 3 divisions, 9 multiplications, 12 additions and 13 subtractions.

Fig. 5C

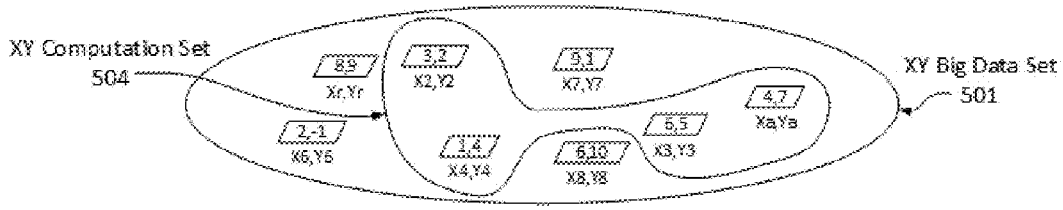

XY Computation Set Size 502: 4

Calculate Linear Regression Coefficients for XY Computation Set 504

Iterative Algorithm 2:

1. Use equations 417 and 418 to calculate $\bar{x}_2$ and $\bar{y}_2$ respectively $$\bar{x}_2 = \bar{x}_1 + \frac{(x_a - x_r)}{4} = 4.5 + \frac{(4-8)}{4} = 3.5$$

$$\bar{y}_2 = \bar{y}_1 + \frac{(y_a - y_r)}{4} = 5 + \frac{(7-9)}{4} = 4.5$$

Operations in this step: 2 division, 2 additions, 2 subtractions

2. Use equation 431 to iteratively calculate $SSDX_2$ $$SSDX_2 = SSDX_1 + (x_a - x_r)\big((x_r + x_a) - (\bar{x}_1 + \bar{x}_2)\big) = 29 + (4-8)\big((8+4) - (4.5 + 3.5)\big)$$
$$= 29 + (-4)(12 - 8) = 29 + (-4)(4) = 29 + (-16) = 13$$

Operations in this step: 1 multiplication, 3 additions, 2 subtractions

3. Use equation 434 to calculate $SDXY_2$ for the 2$^{nd}$ iteration:

$$SDXY_2 = SDXY_1 + (y_a - \bar{y}_1)(x_a - x_r) + (y_a - y_r)(x_r - \bar{x}_2) = 22 + (7-5)(4-8) +$$
$$(7-9)(8-3.5) = 22 + (2)(-4) + (-2)(4.5) = 22 + (-8) + (-9) = 5$$

Operations in this step: 2 multiplications, 2 additions, 4 subtractions

4. Use equation 435 to calculate $b1_2$ and equation 436 to calculate $b0_2$ for the 2$^{nd}$ iteration:

$$b1_2 = \frac{SDXY_2}{SSDX_2} = \frac{5}{13} = 0.3846153846153846$$

$$b0_2 = \bar{y}_2 - b1_2 \bar{x}_2 = 4.5 - 0.3846153846153846 \times 3.5 = 3.1538461538461539$$

Operations in this step: 1 division, 1 multiplication, 1 subtraction

There are a total of 3 divisions, 4 multiplications, 7 additions and 9 subtractions.

Fig. 5C Cont'd 1

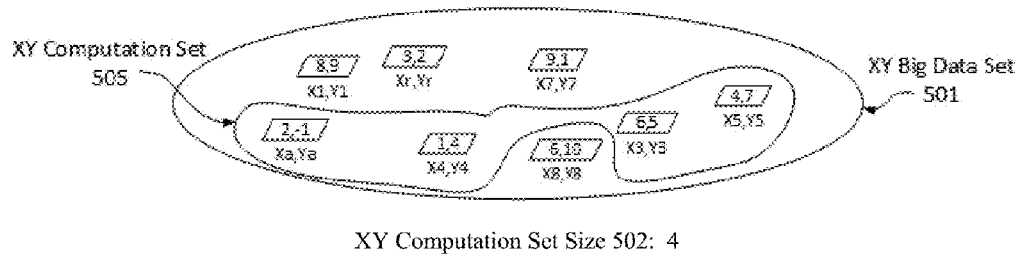

XY Computation Set Size 502: 4

Calculate Linear Regression Coefficients for XY Computation Set 505

Iterative Algorithm 2:

1. Use equations 417 and 418 to calculate $\bar{x}_3$ and $\bar{y}_3$ respectively for the 3$^{rd}$ iteration:

$\bar{x}_3 = \bar{x}_2 + \frac{(x_a - x_r)}{4} = 3.5 + \frac{(2-3)}{4} = 3.25$ $\bar{y}_3 = \bar{y}_2 + \frac{(y_a - y_r)}{4} = 4.5 + \frac{(-1-2)}{4} = 3.75$ Operations in this step: 2 divisions, 2 additions, 2 subtractions 2. Use equations 431 to calculate $SSDX_3$ for the 3$^{rd}$ iteration:

$SSDX_3 = SSDX_2 + (x_a - x_r)\big((x_r + x_a) - (\bar{x}_2 + \bar{x}_3)\big) = 13 + (2-3)\big((3+2) - (3.5 + 3.25)\big)$
$= 13 + (-1)(5 - 6.75) = 13 + (-1)(-1.75) = 13 + 1.75 = 14.75$ Operations in this step: 1 multiplication, 3 additions, 2 subtractions 3. Use equation 434 to calculate $SDXY_3$ for the 3$^{rd}$ iteration:

$SDXY_3 = SDXY_2 + (y_a - \bar{y}_2)(x_a - x_r) + (y_a - y_r)(x_r - \bar{x}_3)$
$= 5 + (-1 - 4.5)(2 - 3) + (-1 - 2)(3 - 3.25) = 11.25$ Operations in this step: 2 multiplications, 2 additions, 4 subtractions 4. Use equation 435 to calculate $b1_3$ and equation 436 to calculate $b0_3$ for the 3$^{rd}$ iteration:

$b1_3 = \frac{SDXY_3}{SSDX_3} = \frac{11.25}{14.75} = 0.7627118644067797$ $b0_3 = \bar{y}_3 - b1_3 \bar{x}_3 = 3.75 - 0.7627118644067797 \times 3.25 = 3.75 - 2.478813559322034025 = 1.271186440677965975$ Operations in this step: 1 division, 1 multiplication, 1 subtraction There are a total of 3 divisions, 4 multiplications, 7 additions and 9 subtractions.

Fig. 5C Cont'd 2

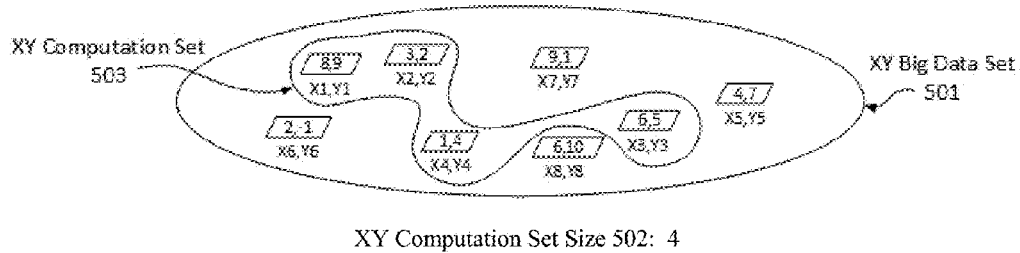

XY Computation Set Size 502: 4

<u>Calculate Linear Regression Coefficients for XY Computation Set 503</u>

Iterative Algorithm 3:

1. Use equations 405 and 406 to calculate the mean of X variable and Y variable in XY computation set 503 respectively:

$$\bar{x}_1 = \frac{8+3+6+1}{4} = \frac{18}{4} = 4.5$$

$$\bar{y}_1 = \frac{9+2+5+4}{4} = \frac{20}{4} = 5$$

Operations in this step: 2 divisions, 6 additions

2. Use equation 437 to calculate $XSS_1$ $$XSS_1 = \sum_1^4 x_i^2 = 8^2 + 3^2 + 6^2 + 1^2 = 64 + 9 + 36 + 1 = 110$$

Operations in this step: 4 multiplications, 3 additions

3. Use equation 440 to calculate $SXY_1$ $$SXY_1 = \sum_1^4 x_i y_i = 8 \times 9 + 3 \times 2 + 6 \times 5 + 1 \times 4 = 72 + 6 + 30 + 4 = 112$$

Operations in this step: 4 multiplications, 3 additions

4. Use equation 443 to calculate $b1_1$ and equation 444 to calculate $b0_1$ for the 1st iteration:

$$b1_1 = \frac{SXY_1 - 4\bar{x}_1\bar{y}_1}{XSS_1 - 4\bar{x}_1^2} = \frac{112 - 4 \times 4.5 \times 5}{110 - 4 \times 4.5^2} = \frac{112 - 90}{110 - 81} = \frac{22}{29} = 0.7586206896551724$$

$$b0_1 = \bar{y}_1 - b1_1\bar{x}_1 = 5 - 0.7586206896551724 \times 4.5 = 1.5862068965517241$$

Operations in this step: 1 division, 4 multiplications, 3 subtractions

There are a total of 3 divisions, 12 multiplications, 12 additions and 3 subtractions.

Fig. 5D

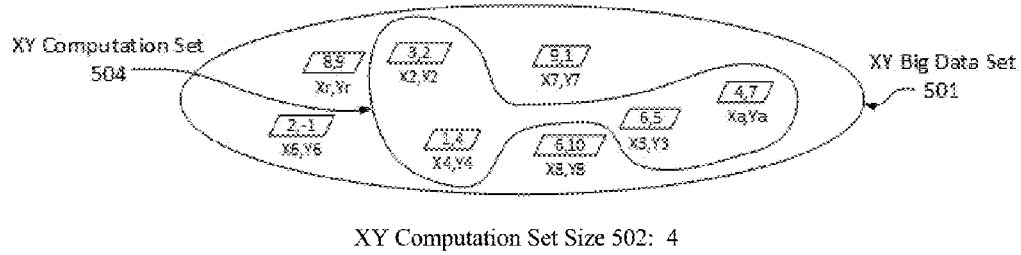

XY Computation Set Size 502: 4

Calculate Linear Regression Coefficients for XY Computation Set 504

Iterative Algorithm 3:

1. Use equations 417 and 418 to calculate $\bar{x}_2$ and $\bar{y}_2$ respectively $$\bar{x}_2 = \bar{x}_1 + \frac{(x_a - x_r)}{4} = 4.5 + \frac{4-8}{4} = 3.5$$

$$\bar{y}_2 = \bar{y}_1 + \frac{(y_a - y_r)}{4} = 5 + \frac{(7-9)}{4} = 4.5$$

Operations in this step: 2 divisions, 2 additions, 2 subtractions

2. Use equation 439 to iteratively calculate $XSS_2$ $$XSS_2 = XSS_1 + x_a^2 - x_r^2 = 110 + 4^2 - 8^2 = 110 + 16 - 64 = 62$$

Operations in this step: 2 multiplications, 1 addition, 1 subtraction

3. Use equation 442 to calculate $SXY_2$ $$SXY_2 = SXY_1 + x_a y_a - x_r y_r = 112 + 4 \times 7 - 8 \times 9 = 112 + 28 - 72 = 68$$

Operations in this step: 2 multiplications, 1 addition, 1 subtraction

4. Use equation 443 to calculate $b1_2$ and equation 444 to calculate $b0_2$ for the 2nd iteration:

$$b1_2 = \frac{SXY_2 - 4\bar{x}_2\bar{y}_2}{XSS_2 - 4\bar{x}_2^2} = \frac{68 - 4 \times 3.5 \times 4.5}{62 - 4 \times 3.5^2} = \frac{68 - 63}{62 - 49} = \frac{5}{13} = 0.3846153846153846$$

$$b0_2 = \bar{y}_2 - b1_2\bar{x}_2 = 4.5 - 0.3846153846153846 \times 3.5 = 3.1538461538461539$$

Operations in this step: 1 division, 4 multiplications, 3 subtractions

There are a total of 3 divisions, 8 multiplications, 4 additions and 7 subtractions.

Fig. 5D Cont'd 1

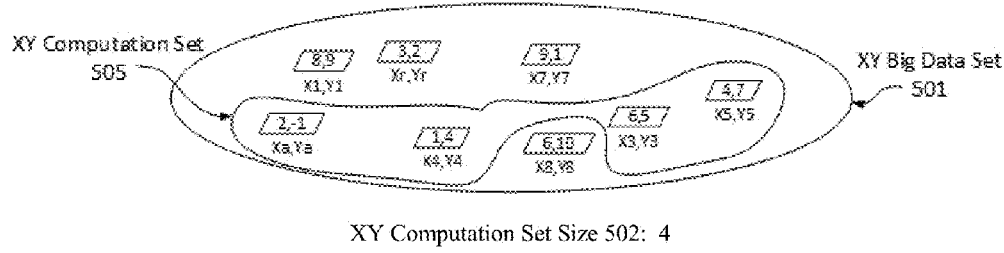

XY Computation Set Size 502: 4

Calculate Linear Regression Coefficients for XY Computation Set 505

Iterative Algorithm 3:

1. Use equation 417 to calculate $\bar{x}_3$ and equation 418 to calculate $\bar{y}_3$ respectively $$\bar{x}_3 = \bar{x}_2 + \frac{(x_a - x_r)}{4} = 3.5 + \frac{(2-3)}{4} = 3.25$$

$$\bar{y}_3 = \bar{y}_2 + \frac{(y_a - y_r)}{4} = 4.5 + \frac{(-1-2)}{4} = 3.75$$

Operations in this step: 2 divisions, 2 additions, 2 subtractions

2. Use equation 439 to calculate $XSS_3$ $$XSS_3 = XSS_2 + x_a^2 - x_r^2 = 62 + 2^2 - 3^2 = 62 + 4 - 9 = 57$$

Operations in this step: 2 multiplications, 1 addition, 1 subtraction

3. Use equation 442 to calculate $SXY_3$ $$SXY_3 = SXY_2 + x_a y_a - x_r y_r = 68 + 2 \times (-1) - 3 \times 2 = 68 - 2 - 6 = 60$$

Operations in this step: 2 multiplications, 1 addition, 1 subtraction

4. Use equation 443 to calculate $b1_3$ and equation 444 to calculate $b0_3$ for the 3$^{rd}$ iteration:

$$b1_3 = \frac{SXY_3 - 4\bar{x}_3\bar{y}_3}{XSS_3 - 4\bar{x}_3^2} = \frac{60 - 4 \times 3.25 \times 3.75}{57 - 4 \times 3.25^2} = \frac{60 - 48.75}{57 - 42.25} = \frac{11.25}{14.75} = 0.7627118644067797$$

$$b0_3 = \bar{y}_3 - b1_3\bar{x}_3 = 3.75 - 0.7627118644067797 \times 3.25 = 3.75 - 2.478813559322034025 = 1.271186440677965975$$

Operations in this step: 1 division, 4 multiplications, 3 subtractions

There are a total of 3 divisions, 8 multiplications, 4 additions and 7 subtractions.

Fig. 5D Cont'd 2

|  | Division | Multiplication | Addition | Subtraction |
|---|---|---|---|---|
| Traditional Algorithm | 3 | 9 | 12 | 13 |
| Iterative Algorithm 1 | 3 | 9 | 4 | 7 |
| Iterative Algorithm 2 | 3 | 4 | 7 | 9 |
| Iterative Algorithm 3 | 3 | 8 | 4 | 7 |

|  | Division | Multiplication | Addition | Subtraction |
|---|---|---|---|---|
| Traditional Algorithm | 3 | 2,000,001 | 3,999,996 | 3,000,001 |
| Iterative Algorithm 1 | 3 | 9 | 4 | 7 |
| Iterative Algorithm 2 | 3 | 4 | 7 | 9 |
| Iterative Algorithm 3 | 3 | 8 | 4 | 7 |

ITERATIVE SIMPLE LINEAR REGRESSION COEFFICIENT CALCULATION FOR BIG DATA USING COMPONENTS

CROSS-REFERENCE TO RELATED APPLICATIONS

This application claims the benefit of provisional patent application Ser. No. 62/126,445, filed 2015 Feb. 28 by the present inventor.

BACKGROUND AND RELEVANT ART

Internet, mobile communications, navigation, online gaming, sensing technologies and large scale computing infrastructures have produced large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Processing Big Data can include performing calculations on multiple data elements. When performing statistical calculations on Big Data, the number of data elements to be accessed may be quite large. For example, when calculating simple linear regression coefficients a (potentially large) number of data elements may need to be accessed.

The difference between processing live data stream and streamed Big Data is that when processing streamed Big Data, all historical data elements are accessible, and thus it may not need to create a separate buffer to store newly received data elements.

Further, some statistical calculations are recalculated after some data changes in a Big Data set. Thus, the (potentially large) number of data elements may be repeatedly accessed. For example, it may be that simple linear regression coefficients are calculated for a computation set and the computation set includes n pairs of data elements of a Big Data set stored in storage media. As such, every time an existing pair of data elements (one data element from an independent variable and the other from a dependent variable) to be removed from the computation set and a pair of data elements to be added to the computation set are accessed or received, the to-be-removed pair of data elements is removed from the computation set and the to-be-added pair of data elements is added to the computation set. All 2n data elements in the computation set are then accessed to re-estimate simple linear regression coefficients.

As such, each pair of data elements remains in the computation set for n simple linear regression coefficient calculations before it is aged out of the computation set. Accordingly, each pair of data elements is read from the buffer and used n times. Performing statistical calculations on streamed data elements this way is time consuming and is an inefficient use of resources. When performing simple linear regression coefficient calculation on all 2n data elements all the 2n data elements in the computation set will be visited and used.

Depending on necessity, the computation set size n may be extremely large, so the data elements in a computation set may be distributed over a cloud comprising hundreds of thousands of computing devices. Re-performing simple linear regression coefficient calculation in traditional ways on a Big Data set after some data changes results in slow response and significant waste of computing resources.

BRIEF SUMMARY

The present disclosure describes methods, systems, and computing device program products for iteratively calculating simple linear regression coefficients for Big Data. A computing system comprising one or more computing devices includes one or more storage media that have stored a Big Data set. Said Big Data set contains observations of an independent variable and a dependent variable. A computation set size indicates a specified number n (n>1) pairs of data elements in a computation set of the Big Data set. Each of said pairs of data elements contains an observation of an independent variable and an observation of a dependent variable. Iteratively calculating simple linear regression coefficients for a modified computation set includes iteratively calculating one or more (p (p≥1)) components of the simple linear regression coefficients for the modified computation set based on one or more components of simple linear regression coefficients for a previous computation set and then calculating the simple linear regression coefficients as needed using one or more iteratively calculated components. Iteratively calculating simple linear regression coefficients avoids visiting all data elements in the modified computation set and performing redundant computations thereby increasing calculation efficiency, saving computing resources and reducing computing system's power consumption.

The computing system initializes one or more components of simple linear regression coefficients for the computation set. The initialization of the one or more components comprises calculating the one or more components through their definitions based on the data elements in the computation set or accessing or receiving pre-calculated one or more components from one or more computing-device-readable media.

The computing system accesses an existing pair of data elements to be removed from the computation set and a pair of data elements to be added to the computation set. The computing system modifies the computation set by removing the to-be-removed pair of data elements from the computation set and adding the to-be-added pair of data elements to the computation set.

The computing system iteratively calculates one or more components of the simple linear regression coefficients for the modified computation set based on the one or more components for the previous computation set.

The iterative calculation of the one or more components of the simple linear regression coefficients for the modified computation set includes directly iteratively calculates v (1≤v≤p) components. Directly iteratively calculating the v components includes accessing the v components. Directly iteratively calculating the v components includes calculating each of the v components one by one. Directly iteratively calculating each of the v components includes removing any contribution of the removed pair of data elements from each of the v components mathematically. Directly iteratively calculating each of the v components includes adding a contribution of the added pair of data elements to each of the v components mathematically.

The iterative calculation of the one or more components of the simple linear regression coefficients for the modified computation set includes indirectly iteratively calculates w=p−v components as needed, i.e., the w components only need to be calculated when simple linear regression coefficients are accessed. Indirectly iteratively calculating the w components includes indirectly iteratively calculating each of the w components one by one. Indirectly iteratively calculating a component includes accessing and using one or more components other than said component itself.

The computing system performs simple linear regression coefficient calculation as needed using one or more initialized or iteratively calculated components.

The computing system may keep accessing an existing pair of data elements to be removed from the computation set and a pair of data elements to be added to the computation set, modifying the computation set, iteratively calculating one or more components and performing simple linear regression coefficient calculation as needed using the one or more iteratively calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of simple linear regression coefficients and traditional equations for calculating simple linear regression coefficients on a computation set.

FIG. 4B illustrates some components of simple linear regression coefficients, which may be used for calculating simple linear regression coefficients on a computation set.

FIG. 4C illustrates the first example iterative simple linear regression coefficient calculation algorithm (iterative algorithm 1) and its equations for iteratively calculating simple linear regression coefficients based on iteratively calculated components $XS_{k+1}$ or $\bar{x}_{k+1}$ and $YS_{k+1}$ or $\bar{y}_{k+1}$, $XV_{k+1}$, and $SXY_{k+1}$.

FIG. 4D illustrates the second example iterative simple linear regression coefficient calculation algorithm (iterative algorithm 2) and its equations for iteratively calculating simple linear regression coefficients based on iteratively calculated components $SSDX_{k+1}$, $SDXY_{k+1}$ and $XS_k$ or $\bar{x}_k$, $YS_k$ or $\bar{y}_k$, $XS_{k+1}$ or $\bar{x}_{k+1}$ and $YS_{k+1}$ or $\bar{y}_{k+1}$.

FIG. 4E illustrates the third example iterative simple linear regression coefficient calculation algorithm (iterative algorithm 3) and its equations for iteratively calculating simple linear regression coefficients based on iteratively calculated components $XS_{k+1}$ or $\bar{x}_{k+1}$ and $YS_{k+1}$ or $\bar{y}_{k+1}$, $XSS_{k+1}$ and $SXY_{k+1}$.

FIG. 5A illustrates an example of calculating simple linear regression coefficients using traditional algorithms as shown in FIG. 4A.

FIG. 5B illustrates an example of calculating simple linear regression coefficients using iterative algorithm 1 as shown in FIG. 4C.

FIG. 5C illustrates an example of calculating simple linear regression coefficients using iterative algorithm 2 as shown in FIG. 4D.

FIG. 5D illustrates an example of calculating simple linear regression coefficients using iterative algorithm 3 as shown in FIG. 4E.

FIG. 6 illustrates computational loads for traditional algorithms and iterative algorithms with a computation set of size 4.

FIG. 7 illustrates computational loads for traditional algorithms and iterative algorithms with a computation set of size 1,000,000.

DETAILED DESCRIPTION

Figure 1:
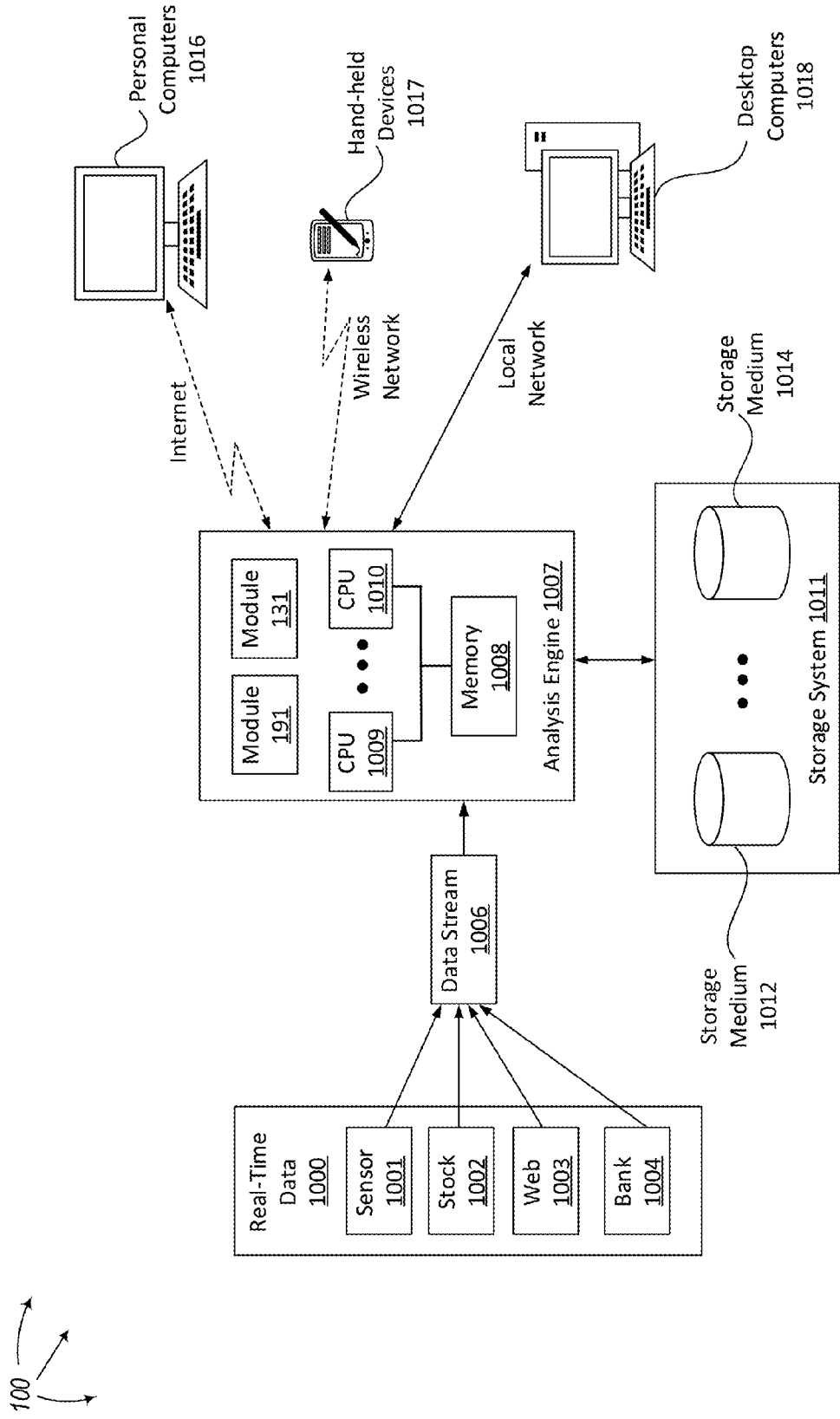
FIG. 1 illustrates a high-level overview of an example computing system that facilitates iteratively calculating simple linear regression coefficients for Big Data.

The present disclosure describes methods, systems, and computing system program products for iteratively calculating simple linear regression coefficients for Big Data. A computing system comprising one or more computing devices includes one or more storage media that have stored a Big Data set. Said Big Data set contains observations of an independent variable and a dependent variable. A computation set size indicates a specified number n (n>1) pairs of data elements in a computation set of the Big Data set. Each of said pairs of data elements contains an observation of an independent variable and an observation of a dependent variable. Iteratively calculating simple linear regression coefficients for a modified computation set includes iteratively calculating one or more (p (p≥1)) components of the simple linear regression coefficients for the modified computation set based on one or more components of simple linear regression coefficients for a pre-modified computation set and then calculating the simple linear regression coefficients as needed using one or more calculated components. Iteratively calculating simple linear regression coefficients avoids visiting all data elements in the modified computation set and performing redundant computations thereby increasing calculation efficiency, saving computing resources and reducing computing system's power consumption.

Linear regression is an approach for modeling the relationship between a scalar dependent variable Y and one or more explanatory or independent variables denoted X. The case of one explanatory or independent variable is called simple linear regression. Simple linear regression has many practical uses. Most applications fall into one of the following two broad categories:

If the goal is prediction, forecasting, or reduction, simple linear regression may be used to fit a predictive model to an observed data set of Y and X values. After developing such a model, if an additional value of X is then given without its accompanying value of Y, the fitted model may be used to make a prediction of the value of Y.

Given a variable Y and a variable X that may be related to Y, simple linear regression analysis may be applied to quantify the strength of the relationship between Y and X.

A statistical model is a description of a state or process. Simple linear regression is for modeling the linear relationship between two variables. A simple linear regression model is often written as the following form $$Y=\beta 0+\beta 1X+\varepsilon$$

Where Y is the dependent variable, $\beta 0$ is the Y intercept, $\beta 1$ is the gradient or the slope of the regression line, X is the independent variable, and $\varepsilon$ is the error. It is usually assumed that error $\varepsilon$ is normally distributed with $E(\varepsilon)=0$ and a constant variance $Var(\varepsilon)=\sigma^2$ in the simple linear regression. Linear regression calculation involves estimating $\beta 1$ and $\beta 0$ based on observed values from X and Y. The least squares principle for the simple linear regression model is to find estimates b1 and b0 such that the sum of the squared distance from actual response $y_i$ and predicted response $\hat{y}_i=\beta 0+\beta 1x_i$ reaches the minimum among all possible choices of regression coefficients $\beta 0$ and $\beta 1$. The relationship between Y and X may be described by a fitted regression line $\hat{Y}=b0+b1X$. The estimates b1 and b0 may be calculated using following equations:

$$b1 = \frac{\sum_i^n (x_i - \bar{x}_k)(y_i - \bar{y}_k)}{\sum_i^n (x_i - \bar{x}_k)^2}$$

$$b0 = \bar{y}_k - b1\bar{x}_k$$

The estimates b1 and b0 are called simple linear regression coefficients. Once b1 is calculated, b0 may be calculated.

As used herein, a computation set is a data set which contains data elements involved in simple linear regression coefficient calculation. A computation set is equivalent to a moving computation window when calculating simple linear regression coefficients on streamed data or time series data. Within the description of embodiments of the present invention, the difference between a computation window and a computation set is that data elements in a computation window are ordered but that in a computation set are not. Simple linear regression coefficient calculation may work on either a computation set or a computation window.

Simple linear regression calculation works on two variables, however data elements involved in simple linear regression coefficient calculation should be calculated in pairs (i.e., the coordinates of a point in a 2-D space), thus the data elements from two variables are grouped into pairs and put into a single computation set. When removing an existing pair of data elements from a computation set, the pair of data elements is not necessarily the least recent pair of data elements previously added to the computation set. The computation set may be either input and stored separately or input and stored in a combined interleaved manner. For the former case, there will be two Big Data sets or input streams and each Big Data set or input stream contains the data elements of one variable respectively. For the latter case, there will be a single Big Data set or input stream and the Big Data set or input stream contains multiple data pairs with each data pair containing one data element from each variable.

As used herein, a component is a quantity or expression appearing in simple linear regression's coefficients definition equations or any transforms of the definition equations. A simple linear regression coefficient is the largest component of a simple linear regression coefficient itself. Simple linear regression coefficients may be calculated using one or more components. Some example components of simple linear regression coefficients may be found in FIG. 4B.

A component may be either directly iteratively calculated or indirectly iteratively calculated. The difference is that when directly iteratively calculating a component, the component is calculated based on the component's value in previous iteration but when indirectly iteratively calculating a component, the component is calculated based on components other than the component itself.

For a given component, it might be directly iteratively calculated in one algorithm but indirectly iteratively calculated in another algorithm.

For a given algorithm, assume the total number of different components is p (p≥1), the number of directly calculated components is v (1≤v≤p), then the number of indirectly iteratively calculated components is w=p−v (0≤w≤p). For any algorithm, there will be at least one component being directly iteratively calculated. It is possible that all components are directly iteratively calculated (in this case v=p and w=0). However, directly iteratively calculated components must be calculated in every iteration no matter if simple linear regression coefficients are accessed or not in a specific iteration.

For a given algorithm, if a component is directly iteratively calculated, then the component must be calculated in every iteration (i.e., whenever an existing pair of data elements is removed from and a pair of data elements is added to the computation set). However, if a component is indirectly iteratively calculated, then the component only needs to be calculated as needed (i.e., when simple linear regression coefficients need to be calculated and accessed). Thus, when simple linear regression coefficients are not accessed in a specific iteration and some components are indirectly iteratively calculated, only a small number of components need to be iteratively calculated. Understanding that an indirectly iteratively calculated component may also be used in the calculation of a directly iteratively calculated component. In that case, the indirectly iteratively calculated component should also be calculated in every iteration.

Simple linear regression coefficients may be calculated on a need basis. When simple linear regression coefficients are not accessed for every data change in the computation set, the computing system may just iteratively calculate one or more components for each data change only. Iteratively calculating one or more components avoids visiting all previous input and performing redundant computations thereby increasing calculation efficiency. Simple linear regression coefficients may be calculated using the one or more components and returned whenever it is accessed. Depending on the need, the computing system may calculate simple linear regression coefficients for the computation set using the one or more components.

Embodiments of the invention include iteratively calculating one or more (p (p≥1)) components of simple linear regression coefficients in modified computation set based on one or more (p (p≥1)) components calculated for the previous computation set.

The computing system initializes one or more (v (1≤v≤p)) components of simple linear regression coefficients for the computation set of a specified size n (n>1). Size n indicates the number of pairs of data elements in the computation set. Each of said pairs contains an observation of an independent variable and an observation of a dependent variable. The initialization of the one or more components comprises calculating the one or more components through their definitions based on the data elements in the computation set or accessing or receiving pre-calculated one or more components from one or more computing-device-readable media.

The computing system accesses a pair of data elements to be removed from the computation set and a pair of data elements to be added to the computation set. The computing system modifies the computation set by: removing the to-be-removed pair of data elements from the computation set and adding the to-be-added pair of data elements to the computation set.

The computing system iteratively calculates one or more components of simple linear regression coefficients for the modified computation set based on the one or more components for the previous computation set.

The iterative calculation of the one or more components of the linear regression coefficients for the modified computation set includes directly iteratively calculating v (1≤v≤p) components. Directly iteratively calculating v components includes accessing the v components. Directly iteratively calculating the v components includes directly iteratively calculating each of the v components one by one. Directly iteratively calculating a component includes removing any contribution of the removed pair of data elements from the component mathematically. Directly iteratively calculating a component includes adding a contribution of the added pair of data elements to the component mathematically. For example, iteratively calculating v components includes directly iteratively calculating a sum or a mean for all data elements in the computation set from each of two variables respectively. Directly iteratively calculating the sum or the mean includes accessing the sum or the mean. Directly iteratively calculating the sum or the mean includes removing any contribution of the removed pair of data elements from the sum or the mean mathematically. Directly iteratively calculating the sum or the mean includes adding a contribution of the added pair of data elements to the sum or the mean mathematically.

The iterative calculation of the one or more components of the linear regression coefficients for the modified computation set includes indirectly iteratively calculating w=p−v components as needed. Indirectly iteratively calculating the w components includes indirectly iteratively calculating each of the w components one by one. Indirectly iteratively calculating a component includes accessing and using one or more components other than the component itself (Depending on the specific algorithm used, calculating each of the w components may also need access to and use of the removed pair of data elements and the added pair of data elements). The one or more components may have been initialized, directly iteratively calculated or indirectly iteratively calculated.

The computing system performs simple linear regression coefficient calculation as needed using one or more initialized or iteratively calculated components.

The computing system may keep accessing a pair of data elements to be removed from the computation set and a pair of data elements to be added to the computation set, modifying the computation set, iteratively calculating one or more components and calculating simple linear regression coefficients as needed using the one or more iteratively calculated components, and the computing system may repeat this process for as many times as needed.

Embodiments of the present invention may comprise or utilize a special purpose or general-purpose computing device including computing device hardware, such as, for example, one or more processors and system memory, as discussed in details below. Embodiments within the scope of the present invention also include physical and other computing-device-readable media for carrying or storing computing-device-executable instructions and/or data structures. Such computing-device-readable media may be any available media that can be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention can comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which can be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media can include a network and/or data links which may be used to carry desired program code means in the form of computing-device-executable instructions or data structures and which can be accessed by a general purpose or special purpose computing device. Combinations of the above should also be included within the scope of computing-device-readable media.

Further, upon reaching various computing device components, program code means in the form of computing-device-executable instructions or data structures can be transferred automatically from transmission media to computing device storage media (devices) (or vice versa). For example, computing-device-executable instructions or data structures received over a network or data link can be buffered in RAM within a network interface module (e.g., a "NIC"), and then eventually transferred to computing device RAM and/or to less volatile computing device storage media (devices) at a computing device. Thus, it should be understood that computing device storage media (devices) can be included in computing device components that also (or even primarily) utilize transmission media.

Computing-device-executable instructions comprise, for example, instructions and data which, when executed at a processor, cause a general purpose computing device, special purpose computing device, or special purpose processing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates iteratively calculating simple linear regression coefficients for Big Data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, simple linear regression coefficient calculation module 191 and component calculation modules 131. Simple linear regression coefficient calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Understanding that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
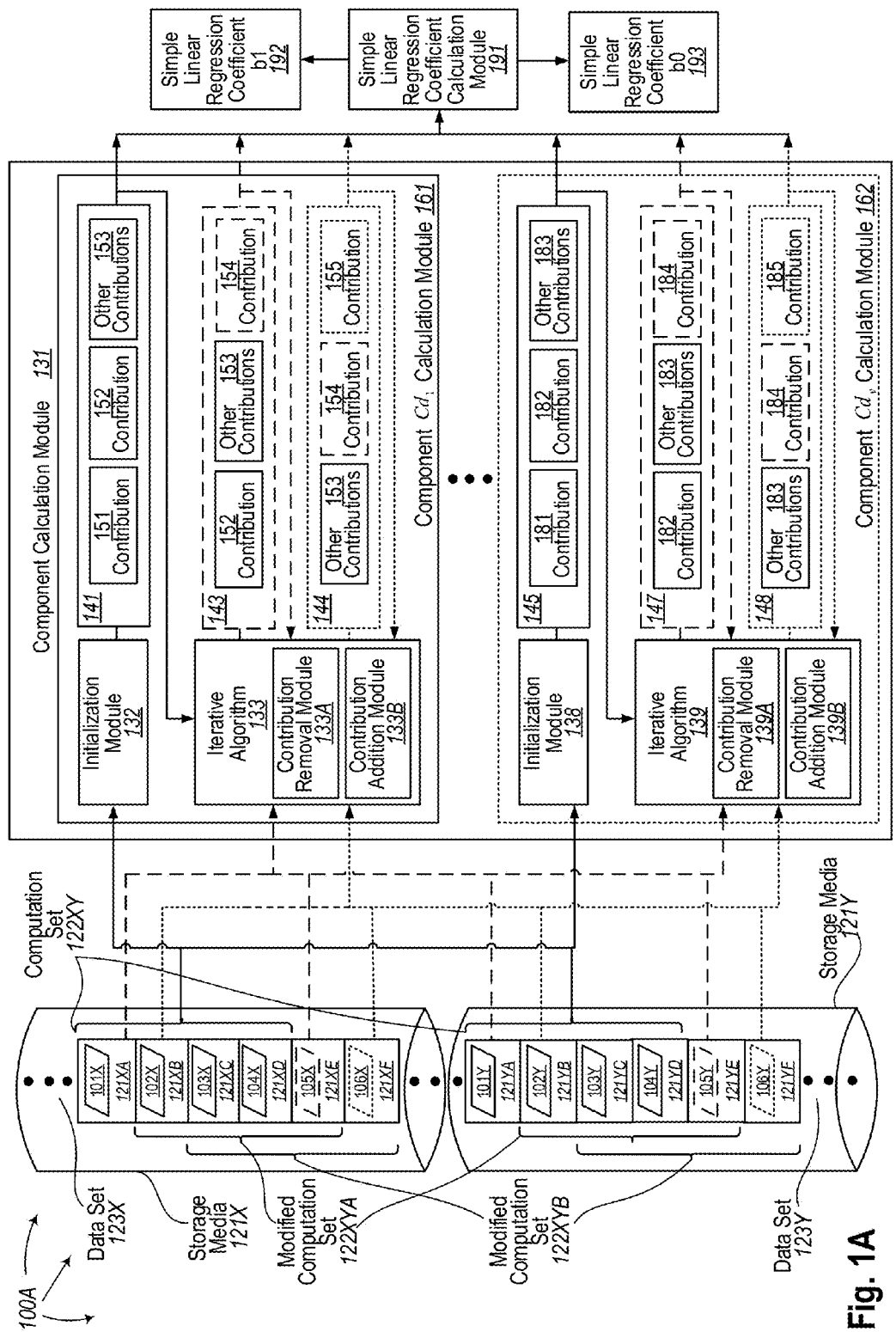
FIG. 1A illustrates an example computing device architecture that facilitates iteratively calculating simple linear regression coefficients with all components being directly iteratively calculated for two Big Data sets.

FIG. 1A illustrates an example computing device architecture 100A that facilitates iteratively calculating simple linear regression coefficients with all (v=p≥1) components being directly iteratively calculated for two Big Data sets. FIG. 1A illustrates 1007 and 1006 shown in FIG. 1. Referring to FIG. 1A, computing device architecture 100A includes component calculation module 131, simple linear regression coefficient calculation module 191 and simple linear regression coefficients b1 192 and b0 193. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. Accordingly, component calculation module 131 as well as any other connected computing devices and their components, can send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of simple linear regression coefficient calculation module 191, and simple linear regression coefficient calculation module 191 will generate simple linear regression coefficients b1 192 and b0 193.

As depicted, there are two storage media: 121X and 121Y. Storage media 121X comprises a data set 123X. Data set 123X comprises multiple data elements stored in multiple locations of storage media 121X. For example, data elements 101X is stored in location 121XA, data element 102X is stored in location 121XB, data element 103X is stored in location 121XC, data element 104X is stored in location 121XD, data element 105X is stored in location 121XE, data element 106X is stored in location 121XF, etc., . . . . There are multiple data elements stored in other locations. Storage media 121Y comprises a data set 123Y. Data set 123Y comprises multiple data elements stored in multiple locations of storage media 121Y. For example, data elements 101Y is stored in location 121YA, data element 102Y is stored in location 121YB, data element 103Y is stored in location 121YC, data element 104Y is stored in location 121YD, data element 105Y is stored in location 121YE, data element 106Y is stored in location 121YF, etc., . . . . There are multiple data elements stored in other locations.

Assume that simple linear regression coefficient calculation is started from computation set 122XY. Computation set 122XY has a specified size of 4 (i.e., n=4). Computation set 122XY contains 4 pairs of data elements: (101X, 101Y), (102X, 102Y), (103X, 103Y), and (104X, 104Y). 122XY contains a portion of data set 123X and a portion of data set 123Y: data elements 101X, 102X, 103X and 104X from 123X, and data elements 101Y, 102Y, 103Y and 104Y from 123Y. All the data elements ranging from (101X, 101Y) to (104X, 104Y) in computation set 122XY may be accessed for initializing one or more components of simple linear regression coefficients.

Next, a pair of data elements (101X, 101Y) and a pair of data elements (105X, 105Y) may be accessed from locations 121XA, 121YA, 121XE and 121YE respectively. Data elements (101X, 101Y) will be removed from computation set 122XY, and data elements (105X, 105Y) will be added to computation set 122XY, then computation set 122XY becomes modified computation set 122XYA. Modified computation set 122XYA contains 4 pairs of data elements: (102X, 102Y), (103X, 103Y), (104X, 104Y) and (105X, 105Y). The computing system may iteratively calculate simple linear regression coefficients for modified computation set 122XYA.

Subsequently, a pair of data elements (102X, 102Y) and a pair of data elements (106X, 106Y) may be accessed from locations 121XB, 121YB, 121XF and 121YF respectively. Data elements (102X, 102Y) will be removed from modified computation set 122XYA, and data elements (106X, 106Y) will be added to computation set 122XYA, then computation set 122XYA becomes modified computation set 122XYB. Modified computation set 122XYB contains 4 pairs of data elements: (103X, 103Y), (104X, 104Y), (105X, 105Y) and (106X, 106Y). The computing system may iteratively calculate simple linear regression coefficients for modified computation set 122XYB.

More details about the example computing device architecture are provided below.

Referring to computing device architecture 100A, iterative component calculation module 131 comprises one or more (v (v=p≥1)) component calculation modules for directly iteratively calculating v components for data elements in a computation set. Number v varies depending on which iterative algorithm is used. Each component calculation module comprises an initialization module for initializing a component on the initial computation set and an algorithm for directly iteratively calculating the component on modified computation set afterwards. For example, component $Cd_1$ calculation module 161 comprises initialization module 132 and iterative algorithm 133, and component $Cd_v$ calculation module 162 comprises initialization module 138 and iterative algorithm 139.

Initialization module 132 is configured to calculate component $Cd_1$ for data elements in the computation set and component calculation initialization module 138 is configured to calculate component $Cd_v$ for data elements in the computation set. Initialization module 132 and initialization module 138 access or receive full sets of data elements (i.e., 4 pairs of data elements) from the computation set as input. Initialization module 132 calculates component $Cd_1$ and initialization module 138 calculates component $Cd_v$ from the full sets of data elements from the computation set. Thus, each data element contributes to all v components ranging from component $Cd_1$ to component $Cd_v$. Initialization module 132 may be used for an initial component $Cd_1$ calculation or when component $Cd_1$ calculations are reset. Similarly, initialization module 138 may be used for an initial component $Cd_v$ calculation or when component $Cd_v$ calculations are reset.

Iterative algorithm 133 accesses or receives a prior component $Cd_1$ value as input. Iterative algorithm 133 directly iteratively calculates a component $Cd_1$ for the modified computation set from the prior component $Cd_1$ value, the removed pair of data elements and the added pair of data elements. Contribution removal module 133A can remove any contribution of the removed pair of data elements from the prior component $Cd_1$. Contribution addition module 133B can add a contribution of the added pair of data elements to the prior component $Cd_1$. Removing a contribution of the removed pair of data elements along with adding a contribution of the added pair of data elements may be used for calculating component $Cd_1$ for the computation set. Iterative algorithm 139 works in a similar way as iterative algorithm 133. Iterative algorithm 139 accesses or receives a prior component $Cd_v$ value as input. Iterative algorithm 139 calculates a component $Cd_v$ for the modified computation set from the prior component $Cd_v$ value, the removed pair of data elements and the added pair of data elements. Contribution removal module 139A can remove a contribution of the removed pair of data elements from the prior component $Cd_v$. Contribution addition module 139B can add a contribution of the added pair of data elements to the prior component $Cd_v$. Removing any contribution of the removed pair of data elements along with adding a contribution of the added pair of data elements may be used for calculating component $Cd_v$ for the computation set.

Simple linear regression coefficient calculation module 191 is configured to calculate simple linear regression coefficients b1 192 and b0 193 on data elements in the computation set based on one or more initialized or iteratively calculated components as input.

Figure 1B:
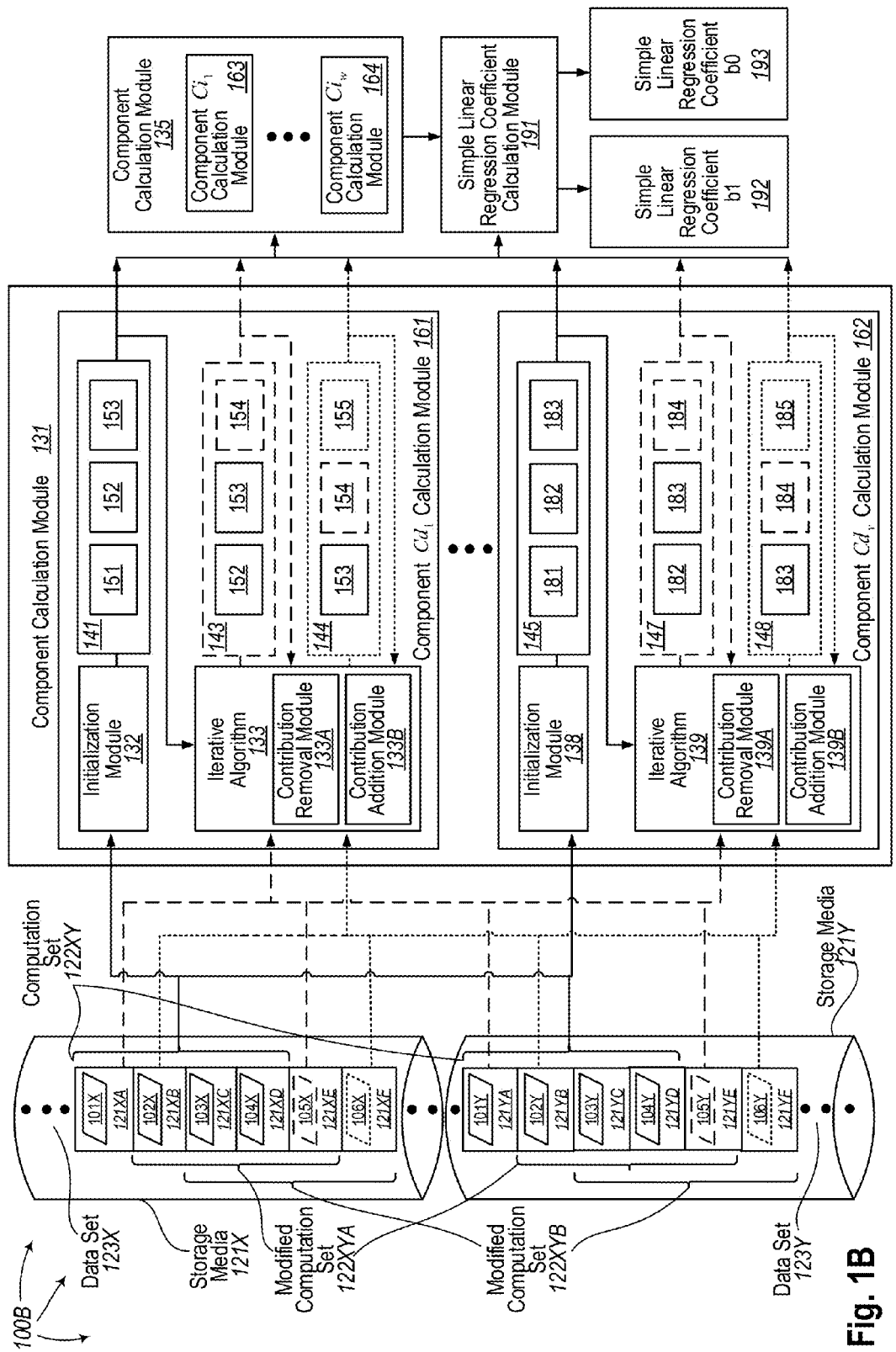
FIG. 1B illustrates an example computing device architecture that facilitates iteratively calculating simple linear regression coefficients with some components being directly iteratively calculated and some components being indirectly iteratively calculated for two Big Data sets.

FIG. 1B illustrates an example computing device architecture 100B that facilitates iteratively calculating simple linear regression coefficients with some (v (1≤v≤p)) components being directly iteratively calculated and some (w (w=p−v)) components being indirectly iteratively calculated for two Big Data sets. In certain implementations, the difference between computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is described here. Number v in 100B may not be the same number v as in 100A, because some directly iteratively calculated components in 100A are indirectly iteratively calculated in 100B. In 100A, v=p≥1, but in 100B, 1≤v<p. Referring to FIG. 1B, computing device architecture 100B includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficient b1 192 and b0 193. Component calculation module 135 generally includes w=p−v component calculation modules for indirectly iteratively calculating w components. For example, component calculation module 135 includes calculation module 163 for indirectly iteratively calculating component $Ci_1$ and calculation module 164 for indirectly iteratively calculating component $Ci_w$, and there are w−2 component calculation modules in between. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

Figure 1C:
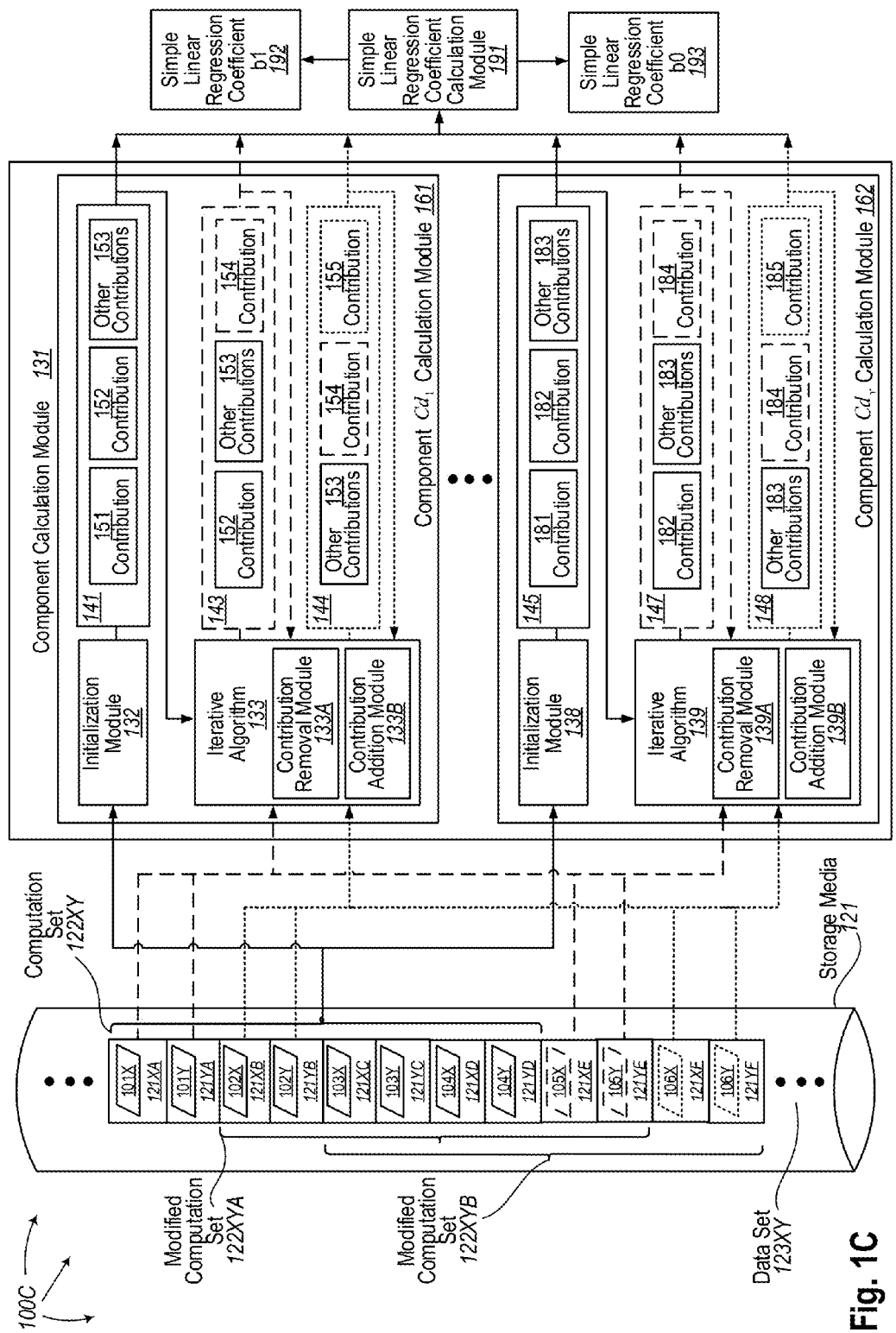
FIG. 1C illustrates an example computing device architecture that facilitates iteratively calculating simple linear regression coefficients with all components being directly iteratively calculated for a Big Data set where observations of two variables are interleaved.

FIG. 1C illustrates an example computing device architecture 100C that facilitates iteratively calculating simple linear regression coefficients with all (v=p≥1) components being directly iteratively calculated for a Big Data set where observations of two variables are interleaved. In certain implementations, the difference between computing device architectures 100C and 100A may be that architecture 100C uses a single Big Data set as input where observations of two variables are interleaved. All parts except the input mode in 100C work in a similar way as those parts with the same reference numbers in 100A. Instead of repeating what have already been explained in the description about 100A, only the different part is described here. Referring to FIG. 1C, there is a storage media 121. Storage media 121 includes a data set 123XY where data elements from data set 123X and data set 123Y from FIG. 1A are interleaved. As pairs of data elements are accessed, the data elements are accessed from locations next to each other. For example, a pair of data elements (101X, 101Y) may be accessed from locations 121XA and 121YA that are next to each other, and a pair of data elements (102X, 102Y) may be accessed from locations 121XB and 121YB that are next to each other, and a pair of data elements (103X, 103Y) may be accessed from locations 121XC and 121YC that are next to each other, and a pair of data elements (104X, 104Y) may be accessed from locations 121XD and 121YD that are next to each other. Computation set 122XY contains 4 pairs of data elements: (101X, 101Y), (102X, 102Y), (103X, 103Y) and (104X, 104Y). The computing system may use data elements in computation set 122XY for initializing one or more components of simple linear regression coefficients.

Next, a pair of data elements (101X, 101Y) to be removed from computation set 122XY and a pair of data elements (105X, 105Y) to be added to computation set 122XY may be accessed. Data elements (101X, 101Y) may be accessed from locations 121XA and 121YA, and data elements (105X, 105Y) may be accessed from locations 121XE and 121YE. After (101X, 101Y) are removed from and (105X, 105Y) are added to computation set 122XY, computation set 122XY becomes modified computation set 122XYA. Modified computation set 122XYA contains 4 pairs of data elements: (102X, 102Y), (103X, 103Y), (104X, 104Y) and (105X, 105Y). The computing system may iteratively calculate simple linear regression coefficients for modified computation set 122XYA.

Subsequently, a pair of data elements (102X, 102Y) to be removed from modified computation set 122XYA and a pair of data elements (106X, 106Y) to be added to modified computation set 122XYA may be accessed. Data elements (102X, 102Y) may be accessed from locations 121XB and 121YB, and data elements (106X, 106Y) may be accessed from locations 121XF and 121YF. After (102X, 102Y) are removed from and (106X, 106Y) are added to modified computation set 122XYA, modified computation set 122XYA becomes modified computation set 122XYB. Modified computation set 122XYB contains 4 pairs of data elements: (103X, 103Y), (104X, 104Y), (105X, 105Y) and (106X, 106Y). The computing system may iteratively calculate simple linear regression coefficients for modified computation set 122XYB.

Figure 1D:
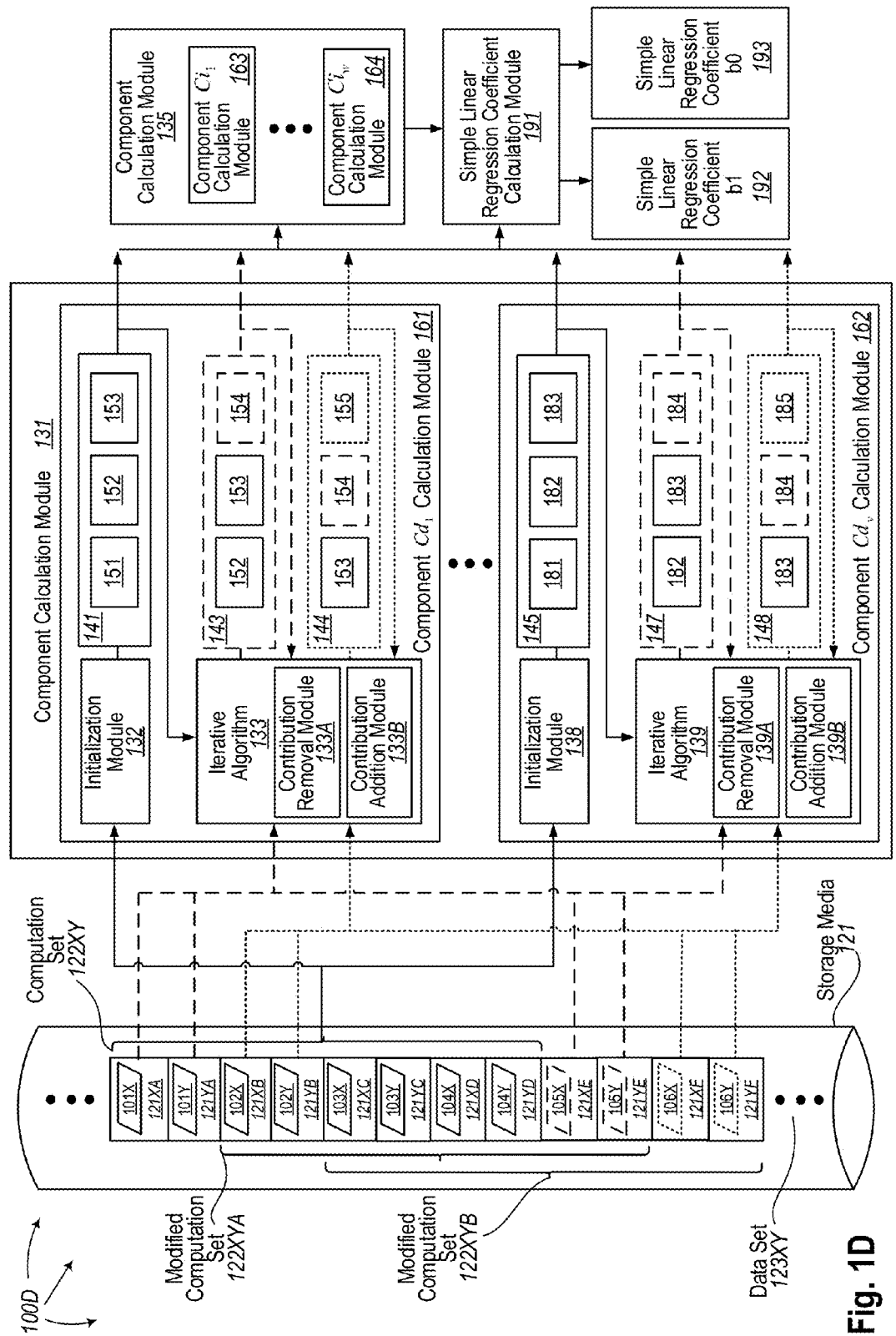
FIG. 1D illustrates an example computing device architecture that facilitates iteratively calculating simple linear regression coefficients with some components being directly iteratively calculated and some components being indirectly iteratively calculated for a Big Data set where observations of two variables are interleaved.

FIG. 1D illustrates an example computing device architecture 100D that facilitates iteratively calculating simple linear regression coefficients for Big Data with a single input where data elements from two Big Data sets are interleaved with some (v (1<v<p)) components being directly iteratively calculated and some (w (w=p−v)) components being indirectly iteratively calculated. In certain implementations, the difference between computing device architectures 100D and 100C may be that architecture 100D includes a component calculation module 135. All parts except component calculation module 135 in 100D work in a similar way as those parts with the same reference numbers in 100C. Instead of repeating what have already been explained in the descriptions about 100A and 100C respectively, only the different part is described here. Number v in 100D may not be the same number v as in 100C, because some directly iteratively calculated components in 100C are indirectly iteratively calculated in 100D. In 100C, v=p≥1, but in 100D, 1≤v<p. Referring to FIG. 1D, computing device architecture 100D includes component calculation module 135. Component calculation module 135 includes w=p−v component calculation modules for indirectly iteratively calculating w components. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

In general, storage media 121, 121X or 121Y may be a single local storage medium and may also be a complex storage system that comprises multiple physically distributed storage devices managed by a storage management system.

In general, data set 123X, 123Y or 123XY may comprise different kinds of data, such as, for example, stock quotes, audio data, video data, geospatial data, web data, mobile communication data, online gaming data, banking transaction data, sensor data, and closed-captioning data, real time text, etc.

Figure 2:
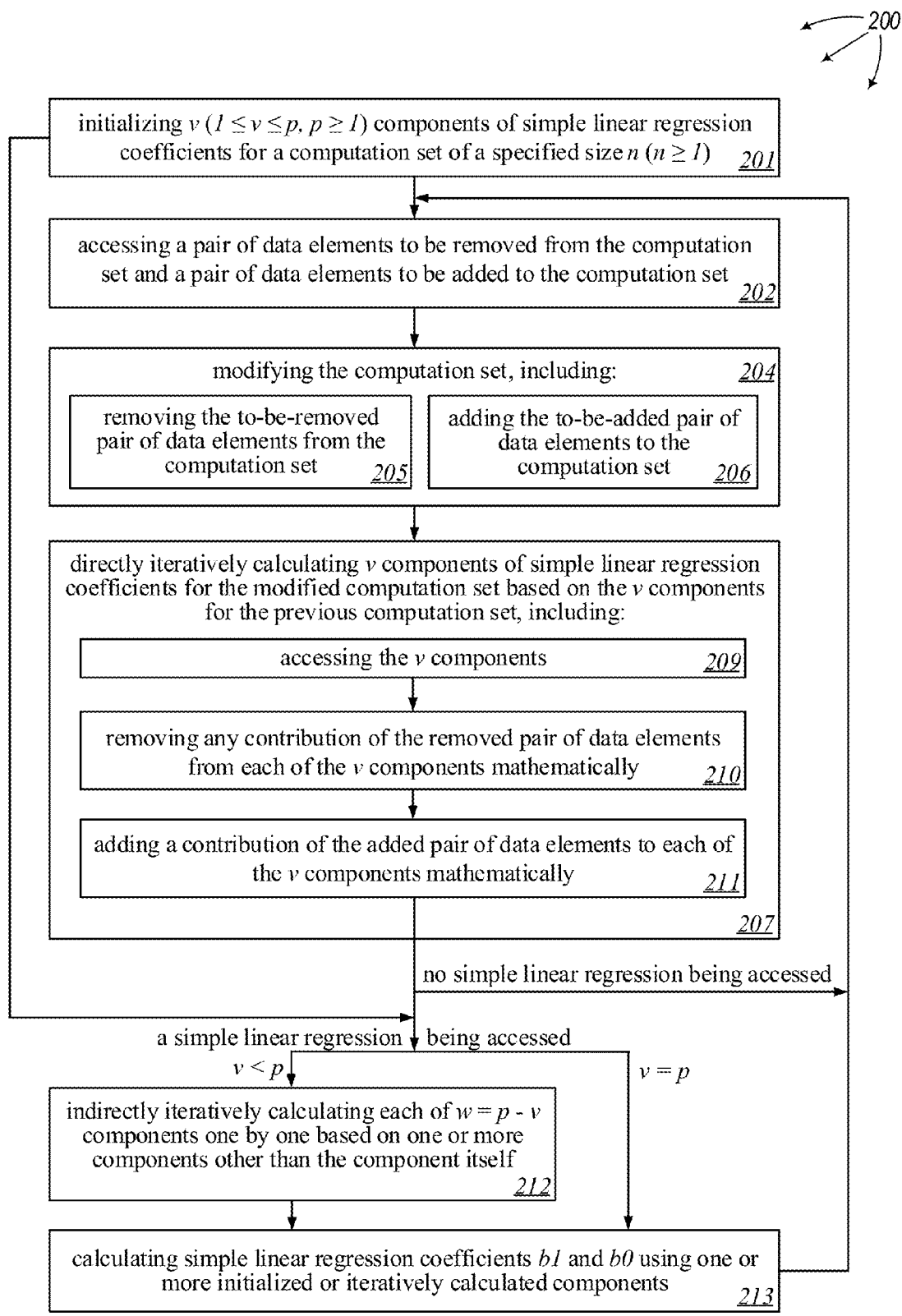
FIG. 2 illustrates a flow chart of an example method for iteratively calculating simple linear regression coefficients for Big Data.

FIG. 2 illustrates a flow chart of an example method 200 for iteratively calculating simple linear regression coefficients for Big Data. Method 200 will be described with respect to the components and data of computing device architectures 100A, 100B, 100C and 100D respectively.

Method 200 includes initializing v ($1 \leq v \leq p$, $p \geq 1$) components of simple linear regression coefficients for a computation set of a specified size n ($n > 1$) (201). The computing system initializes one or more components one by one for the first computation set according to the component's definition based on the data elements in the computation set. For example for computing device architectures 100A, 100B, 100C and 100D, initialization module 132 may be used for calculating component $Cd_1$ 141 from pairs of data elements (101X, 101Y), (102X, 102Y), (103X, 103Y), and (104X, 104Y). As depicted, component $Cd_1$ 141 includes contribution 151, contribution 152, and other contributions 153. Contribution 151 is a contribution from a pair of data elements (101X, 101Y). Contribution 152 is a contribution from a pair of data elements (102X, 102Y). Other contributions 153 are contributions from pairs of data elements (103X, 103Y) and (104X, 104Y). Similarly, initialization module 138 may be used for calculating component $Cd_v$ 145 from pairs of data elements (101X, 101Y), (102X, 102Y), (103X, 103Y), and (104X, 104Y). As depicted, component $Cd_v$ 145 includes contribution 181, contribution 182, and other contributions 183. Contribution 181 is a contribution from a pair of data elements (101X, 101Y). Contribution 182 is a contribution from a pair of data elements (102X, 102Y). Other contributions 183 are contributions from pairs of data elements (103X, 103Y) and (104X, 104Y).

Method 200 includes accessing a pair of data elements to be removed from the computation set and a pair of data elements to be added to the computation set (202). For example, a pair of data elements (105X, 105Y), which is to be added to the computation set, may be accessed subsequent to accessing pairs of data elements (102X, 102Y), (103X, 103Y), and (104X, 104Y).

Method 200 includes modifying the computation set (204). For example, computation set 122XY may become modified computation set 122XYA. Modifying the computation set includes removing the to-be-removed pair of data elements from the computation set (205) and adding the to-be-added pair of data elements to the computation set (206). For example, a pair of data elements (101X, 101Y) is removed from and a pair of data elements (105X, 105Y) is added to computation set 122XY which then becomes modified computation set 122XYA.

Method 200 includes directly iteratively calculating v ($1 \leq v \leq P$) components of simple linear regression coefficients for the modified computation set based on the v components for the previous computation set (207). For example, iterative algorithm 133 may be used for calculating component 143 (for modified computation set 122XYA) based on component 141 (for computation set 122XY), and iterative algorithm 139 may be used for calculating component 147 (for modified computation set 122XYA) based on component 145 (for computation set 122XY).

Directly iteratively calculating the v components of simple linear regression coefficients for the modified computation set includes accessing the v components for the previous computation set (209). For example, iterative algorithm 133 may access component $Cd_1$ 141, and iterative algorithm 139 may access component $Cd_v$ 145.

Directly iteratively calculating one or more components of simple linear regression coefficients for the modified computation set includes removing any contribution of the removed pair of data elements from each of the v components mathematically (210). For example, directly iteratively calculating 143 may include contribution removal module 133A removing contribution 151 (i.e., the contribution from a pair of data elements (101X, 101Y)) from component $Cd_1$ 141 mathematically, and directly iteratively calculating component $Cd_v$ 147 can include contribution removal module 139A removing contribution 181 (i.e., the contribution from a pair of data elements (101X, 101Y)) from component $Cd_v$ 145 mathematically.

Directly iteratively calculating the v components of simple linear regression coefficients for the modified computation set includes adding a contribution of the added pair of data elements to each of the v components mathematically (211). For example, directly iteratively calculating component $Cd_1$ 143 can include contribution addition module 133B adding contribution 154 to component 141 mathematically, and directly iteratively calculating component $Cd_v$ 147 can include contribution addition module 139B adding contribution 184 to component $Cd_v$ 145 mathematically. Contribution 154 and 184 are contributions from a pair of data elements (105X, 105Y).

As depicted in FIGS. 1A, 1B, 1C and 1D, component $Cd_1$ 143 includes contribution 152 (a contribution from a pair of data elements (102X, 102Y)), other contributions 153 (contributions from pairs of data elements (103X, 103Y) and (104X, 104Y)), and contribution 154 (a contribution from a pair of data elements (105X, 105Y)). Similarly, component $Cd_v$ 147 includes contribution 182 (a contribution from a pair of data elements (102X, 102Y)), other contributions 183 (contributions from pairs of data elements (103X, 103Y) and (104X, 104Y)), and contribution 184 (a contribution from a pair of data elements (105X, 105Y)).

Simple linear regression coefficients may be calculated as needed, i.e., it only needs to be calculated when it is accessed, though the v components must be calculated whenever an existing pair of data elements is removed from and a pair of data elements is added to the computation set.

When no simple linear regression coefficients are accessed, Method 200 includes accessing a pair of data elements to be removed from the computation set and a pair of data elements to be added to the computation set.

When simple linear regression coefficients are accessed and when v<p (i.e., not all components are directly iteratively calculated), Method 200 includes indirectly iteratively calculating w=p−v components (212) and then calculating simple linear regression coefficients using one or more initialized or iteratively calculated components (213). For example, referring to FIG. 1B and FIG. 1D, calculation module 163 may be used for indirectly iteratively calculating component $Ci_1$, and calculation module 164 may be used for indirectly iteratively calculating component $Ci_w$. Simple linear regression coefficient calculation module 191 may then calculate simple linear regression coefficients b1 192 and b0 193 based on one or more components ranging from component $Cd_1$ 143 to component $Cd_v$ 147 and component $Ci_1$ to component $Ci_w$.

When simple linear regression coefficients are accessed and when v=p (i.e., all components are directly iteratively calculated), Method 200 includes calculating simple linear regression coefficients as needed using one or more components (213). For example, referring to computing device architectures 100A and 100C, simple linear regression coefficient calculation module 191 may then calculate simple linear regression coefficients b1 192 and b0 193 based on one or more calculated components ranging from component $Cd_1$ 143 to component $Cd_v$ 147.

202-211 may be repeated as additional pairs of data elements are accessed, and 212-213 may be repeated as needed. For example, subsequent to calculating components ranging from $Cd_1$ 143 to $Cd_v$ 147, a pair of data elements (102X, 102Y) and a pair of data elements (106X, 106Y) may be accessed (202). (102X, 102Y) may be accessed from locations 121XB and 121YB. (106X, 106Y) may be accessed from locations 121XF and 121YF. Modified computation set 122XYA may become modified computation set 122XYB (204) after removing the to-be-removed pair of data elements (102X, 102Y) (205) and adding the to-be-added pair of data elements (106X, 106Y) (206).

Iterative algorithm 133 may directly iteratively calculate component $Cd_1$ 144 (for modified computation set 122XYB) based on component $Cd_1$ 143 (for modified computation set 122XYA) (207). Iterative algorithm 133 may access component $Cd_1$ 143 (209). Directly iteratively calculating component $Cd_1$ 144 may include contribution removal module 133A removing contribution 152 (i.e., the contribution from the pair of data elements (102X, 102Y) removed from the computation set) from component $Cd_1$ 143 mathematically (210). Directly iteratively calculating component $Cd_1$ 144 may include contribution addition module 133B adding contribution 155 (i.e., the contribution from the pair of data elements (106X, 106Y) added to the computation set) to component $Cd_1$ 143 mathematically (211). Similarly, iterative algorithm 139 may directly iteratively calculate component $Cd_v$ 148 (for modified computation set 122XYB) based on component $Cd_v$ 147 (for modified computation sets 122XYA) (207). Iterative algorithm 139 may access component $Cd_v$ 147 (209). Directly iteratively calculating component $Cd_v$ 148 may include contribution removal module 139A removing contribution 182 (i.e., the contribution from the pair of data elements (102X, 102Y) removed from the computation set) from component $Cd_v$ 147 mathematically (210). Directly iteratively calculating component $Cd_v$ 148 may include contribution addition module 139B adding contribution 185 (i.e., the contribution from the pair of data elements (106X, 106Y) added to the computation set) to component $Cd_v$ 147 mathematically (211).

As depicted in FIGS. 1A, 1B, 1C and 1D, component $Cd_1$ 144 includes other contributions 153 (contributions of pairs of data elements (103X, 103Y) and (104X, 104Y)), contribution 154 (a contribution of the pair of data elements (105X, 105Y)), and contribution 155 (a contribution of the pair of data elements (106X, 106Y)), and component $Cd_v$ 148 includes other contributions 183 (contributions of pairs of data elements (103X, 103Y) and (104X, 104Y)), contribution 184 (a contribution of the pair of data elements (105X, 105Y)), and contribution 185 (a contribution of the pair of data elements (106X, 106Y)).

When simple linear regression coefficients are accessed and when v=p (i.e., all components are directly iteratively calculated), Method 200 includes calculating simple linear regression coefficients as needed using one or more components (213). For example, referring to computing device architectures 100A and 100C, simple linear regression coefficient calculation module 191 can then calculate simple linear regression coefficients b1 192 and b0 193 based on one or more calculated components ranging from component $Cd_1$ 144 to component $Cd_v$ 148.

When next two pairs of data elements are accessed, component $Cd_1$ 144 may be used for directly iteratively calculating a component $Cd_1$ for the modified computation set and component $Cd_v$ 148 may be used for directly iteratively calculating a component $Cd_v$ for the modified computation set.

Figure 3B:
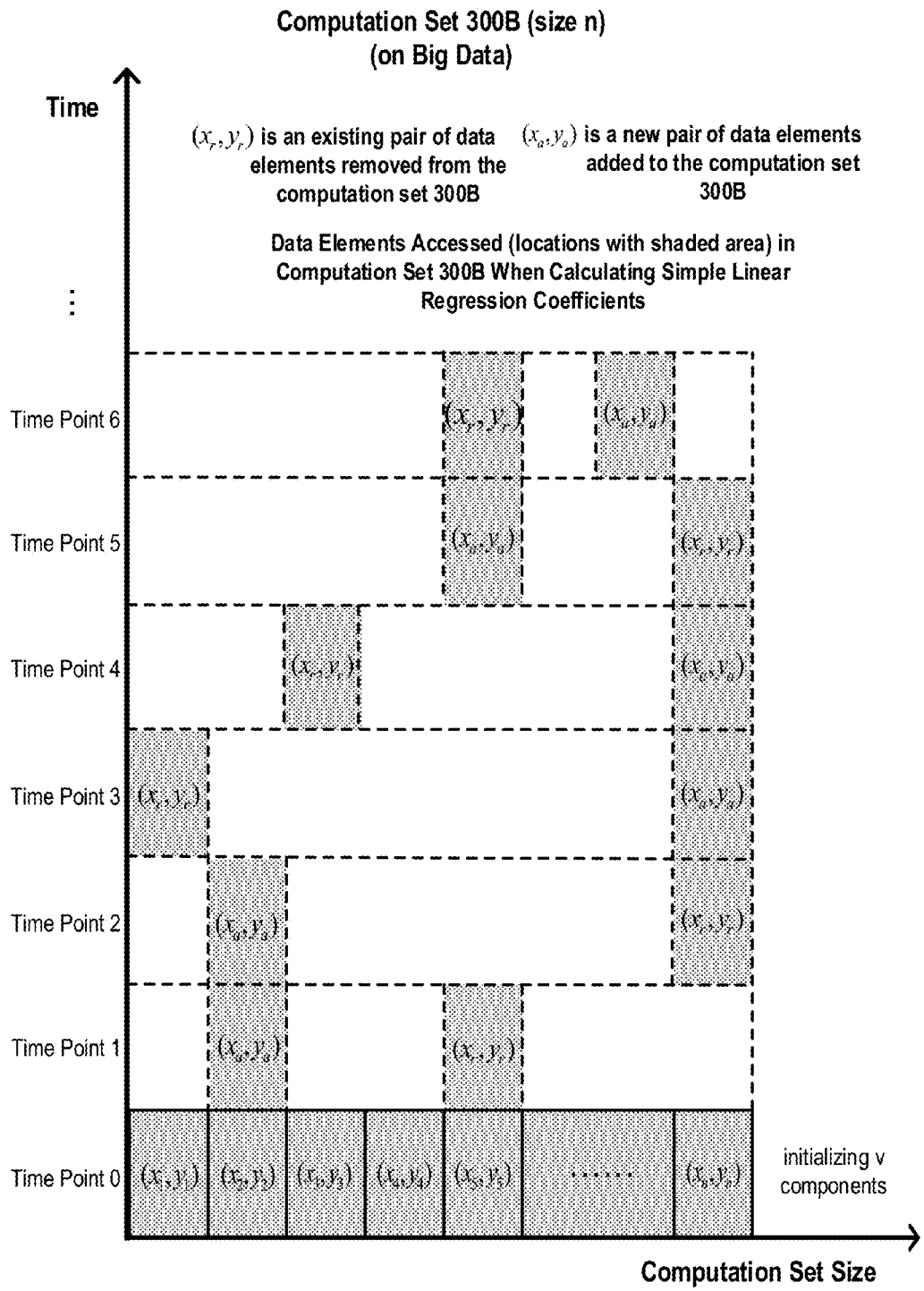
FIG. 3B illustrates data elements that are accessed from a computation set for iteratively calculating simple linear regression coefficients on Big Data. The computation set contains a fixed number of pairs of data elements from two variables. Each pair of data elements contains one data element from one variable and the other data element from the other variable.

FIG. 3B illustrates data elements that are accessed from, one of the computation set, computation set 300B for iteratively calculating simple linear regression coefficients on Big Data. Data elements in the other computation set are accessed in a similar way. The difference between a computation set and a computation window is that the data elements in a computation set are not ordered (e.g., an existing data element may be removed from any position of a computation set and a data element may be added to any position of the computation set). For example, referring to FIG. 3B, an existing data element may be removed from any position (indicated by letter "r") within computation set 300B and a data element may be added to any position (indicated by letter "a") within computation set 300B. For computation set 300B, the first n data elements are accessed for calculating one or more (p (p=v+w)) components for the first computation set and then calculating simple linear regression coefficients as needed. As time progresses, an existing data element removed from computation set 300B and a data element added to computation set 300B are accessed for directly iteratively calculating v components for the modified computation set, while all other data elements are not touched. The v components may be directly iteratively calculated from an existing data element removed, a data element added and the v components for the previous computation set. For a given iterative algorithm, v is a constant, so the number of operations for directly iteratively calculating v components is a constant, and the number of operations for indirectly iteratively calculating w=p−v components is also a constant. Thus, after calculation of the one or more components for the first computation set, computation workload is reduced and remains constant. The larger the n, the more substantial the reduction in computation workload.

FIG. 4A illustrates equations for calculating simple linear regression coefficients. Suppose a computation set $XY=\{(x_i, y_i)|i=1, \ldots, n\}$ contains the data elements to be involved in simple linear regression coefficient calculation, where data elements $x_1, x_2, x_3, x_4, \ldots, x_n$ are observed data from a predictor variable X and data elements $y_1, y_2, y_3, y_4, \ldots, y_n$ are observed data from a response variable Y, simple linear regression coefficients need to be calculated. Equation 401 is a traditional equation for calculating simple linear regression coefficient $b1_k$ which is a slope of a fitted regression line. Equation 402 is a traditional equation for calculating simple linear regression coefficient $b0_k$ which is an intercept of the fitted regression line. Equation 403 is a traditional equation for calculating sum $XS_k$ of all the data elements of X variable in computation set XY in the $k^{th}$ iteration. Equation 404 is a traditional equation for calculating sum $YS_k$ of all the data elements of Y variable in computation set XY in the $k^{th}$ iteration. Equation 405 is a traditional equation for calculating mean $\bar{x}_k$ of all the data elements of X variable in computation set XY in the $k^{th}$ iteration. Equation 406 is a traditional equation for calculating mean $\bar{y}_k$ of all the data elements of Y variable in computation set XY in the $k^{th}$ iteration. Equation 407 is a traditional equation for calculating simple linear regression $b1_k$ in the $k^{th}$ iteration. Equation 408 is a traditional equation for calculating simple linear regression $b0_k$ in the $k^{th}$ iteration.

Assuming computation set XY of size n is changed with an existing pair of data elements $(x_r, y_r)$ $(1 \leq r \leq n)$ being removed and a pair of data elements $(x_a, y_a)$ being added.

Whenever an existing pair of data elements is removed and a pair of data elements is added, the computation set is considered as a new computation set. Define the modified computation set as XY'. A new iteration of calculation is started each time any component of simple linear regression coefficients is recalculated due to a data change in the computation set. Equation 409 is for calculating sum $XS_{k+1}$ of all the data elements of X variable in computation set XY' in the $k+1^{th}$ iteration. Equation 410 is for calculating sum $YS_{k+1}$ of all the data elements of Y variable in computation set XY' in the $k+1^{th}$ iteration. Equation 411 is for calculating mean $\bar{x}_{k+1}$ of all the data elements of X variable in computation set XY' in the $k+1^{th}$ iteration. Equation 412 is for calculating a mean $\bar{y}_{k+1}$ of all the data elements of Y variable in computation set XY' in the $k+1^{th}$ iteration. Equation 413 is for calculating simple linear regression coefficient $b1_{k+1}$ for the modified computation set XY' in the $k+1^{th}$ iteration. Equation 414 is for calculating simple linear regression coefficient $b0_{k+1}$ for the modified computation set XY' in the $k+1^{th}$ iteration.

FIG. 4B illustrates some example components of simple linear regression coefficients and a few basic iterative component calculation equations that may be used in all example iterative algorithms. The following are some example components of simple linear regression coefficients.

$$XS_k = \sum_1^n x_i$$

$$YS_k = \sum_1^n y_i$$

$$\bar{x}_k = \frac{XS_k}{n} = \frac{1}{n}\sum_i^n x_i$$

$$\bar{y}_k = \frac{YS_k}{n} = \frac{1}{n}\sum_1^n y_i$$

$$XSS_k = \sum_1^n x_i^2$$

$$XV_k = \sum_1^n x_i^2 - n\bar{x}_k^2 = XSS_k - \frac{XS_k^2}{n} = XSS_k - n\bar{x}_k^2$$

$$SSDX_k = \sum_1^n \left(x_i - \frac{XS_k}{n}\right)^2 = \sum_1^n (x_i - \bar{x}_k)^2$$

$$SDXY_k = \sum_1^n (x_i - \bar{x}_k)(y_i - \bar{y}_k) = \sum_1^n \left(x_i - \frac{XS_k}{n}\right)(y_i - \bar{y}_k) =$$

$$\sum_1^n (x_i - \bar{x}_k)\left(y_i - \frac{YS_k}{n}\right) = \sum_1^n \left(x_i - \frac{XS_k}{n}\right)\left(y_i - \frac{YS_k}{n}\right)$$

$$SXY_k = \sum_1^n x_i y_i$$

$$x\sigma_k^2 = \frac{\sum_1^n x_i^2}{n} - \bar{x}_k^2 = \frac{\sum_1^n x_i^2}{n} - \left(\frac{XS_k}{n}\right)^2$$

$$b1_k = \frac{\sum_1^n (x_i - \bar{x}_k)(y_i - \bar{y}_k)}{\sum_1^n (x_i - \bar{x}_k)^2} = \frac{\sum_1^n \left(x_i - \frac{XS_k}{n}\right)(y_i - \bar{y}_k)}{\sum_1^n \left(x_i - \frac{XS_k}{n}\right)^2} =$$

$$\frac{\sum_1^n (x_i - \bar{x}_k)\left(y_i - \frac{YS_k}{n}\right)}{\sum_1^n (x_i - \bar{x}_k)^2} = \frac{\sum_1^n \left(x_i - \frac{XS_k}{n}\right)\left(y_i - \frac{YS_k}{n}\right)}{\sum_1^n \left(x_i - \frac{XS_k}{n}\right)^2}$$

$$b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$$

There are two simple linear regression coefficients $b1_k$ and $b0_k$. Since $b1_k$ appears in $b0_k$'s definition equation, $b1_k$ is a component of $b0_k$, and all $b1_k$'s components are also $b0_k$'s components. Component $b0_k$'s components $\bar{x}_k$ and $\bar{y}_k$ also appear in $b1_k$'s definition equation, so $\bar{x}_k$ and $\bar{y}_k$ are also $b1_k$'s components. Thus, simple linear regression coefficients $b1_k$ and $b0_k$ may be considered to share some common components. $XS_k$, $YS_k$, $SSDX_k$, $SDXY_k$, $\bar{x}_k$, and $\bar{y}_k$, directly appear in the definition of simple linear regression coefficients, are components of simple linear regression coefficients. $SXY_k$, $XSS_k$, and $XV_k$, appear in a transform expression of simple linear regression coefficients, are also components of simple linear regression coefficients. Even a simple linear regression coefficient itself is considered as a component because it is the largest component appearing in the definition of the simple linear regression coefficient. Simple linear regression coefficients may be calculated based on one or more its components or combinations of them. For example, if $SDXY_k = \sum_1^n (x_i - \bar{x}_k)(y_i - \bar{y}_k)$ and $SSDX_k = \sum_1^n (x_i - \bar{x}_k)^2$ are known, simple linear regression coefficient $b1_k$ may be calculated, and coefficient $b0_k$ may then be calculated too. If all components appeared in simple linear regression's definition equations or transform of the definition equations may be iteratively calculated, then simple linear regression coefficients may be iteratively calculated. Since multiple components of simple linear regression coefficients and even more combinations of the components exist, there are multiple ways (algorithms) supporting iterative simple linear regression coefficient calculation. To illustrate how to use components to iteratively calculate simple linear regression coefficients, three different iterative simple linear regression coefficient calculation algorithms are presented as examples later. A sum $\sum_1^n x_i$ or a mean $$\frac{1}{n}\sum_1^n x_i$$

for X variable is a component to be used in the example iterative simple linear regression coefficient calculation algorithms, and the same is for Y variable, so four equations for iteratively calculating a sum or a mean of X and Y variables in computation set XY' respectively are illustrated in FIG. 4B instead of in each example algorithm. Equation 415 is for directly iteratively calculating sum $XS_{k+1}$ for X variable in computation set XY' for the $k+1^{th}$ iteration when sum $XS_k$ in computation set XY for the $k^{th}$ iteration is known. Equation 415 removes contributions of $x_r$ from $XS_k$ mathematically and adds contributions of $x_a$ to $XS_k$ mathematically to get $XS_{k+1}$. Equation 416 is for directly iteratively calculating sum $YS_{k+1}$ for Y variable of computation set XY' for the $k+1^{th}$ iteration when mean $YS_k$ for Y variable in computation set XY for the $k^{th}$ iteration is known. Equation 416 removes contributions of $y_r$ from $YS_k$ mathematically and adds contributions of $y_a$ to $YS_k$ mathematically to get $YS_{k+1}$. Equation 417 is for directly iteratively calculating mean $\bar{x}_{k+1}$ for X variable in computation set XY' for the $k+1^{th}$ iteration when mean $\bar{x}_k$ for X variable in computation set XY for the $k^{th}$ iteration is known. Equation 417 removes contributions of $x_r$ from $\bar{x}_k$ mathematically and adds contributions of $x_a$ to $\bar{x}_k$ mathematically to get $\bar{x}_{k+1}$. Equation 418 is for directly iteratively calculating mean $\bar{y}_{k+1}$ for Y variable in computation set XY' for the $k+1^{th}$ iteration when mean $\bar{y}_k$ for Y variable of computation set XY for the $k^{th}$ iteration is known. Equation 418 removes contributions of $y_r$ from $\bar{y}_k$ mathematically and adds contributions of $y_a$ to $\bar{y}_k$ mathematically to get $\bar{y}_{k+1}$.

FIG. 4C illustrates the first example iterative simple linear regression calculation algorithm (iterative algorithm 1) for iteratively performing simple linear regression based on iteratively calculated simple linear regression components $XS_{k+1}$ or $\bar{x}_{+1}$, $YS_{k+1}$ or $\bar{y}_{k+1}$, $XV_{k+1}$, and $SXY_{k+1}$. Equation 415 and equation 416 may be used for directly iteratively calculating sum $XS_{k+1}$ for X variable and sum $YS_{k+1}$ for Y variable for the $k+1^{th}$ iteration based on sum $XS_k$ and sum $YS_k$ known for the $k^{th}$ iteration respectively. Equation 417 and equation 418 may be used for directly iteratively calculating mean $\bar{x}_{k+1}$ for X variable and mean $\bar{y}_{k+1}$ for Y variable for the $k+1^{th}$ iteration based on mean $\bar{x}_k$ and mean $\bar{y}_k$ known for the $k^{th}$ iteration respectively. Equation 419 is a traditional equation for calculating square sum $XSS_k$ for computation set XY. Equation 420 is a traditional equation for calculating square sum $XSS_{k+1}$ on modified computation set XY' where an existing pair of data elements $(x_r, y_r)$ is removed and a pair of data elements $(x_a, y_a)$ is added. Equation 421 is for directly iteratively calculating square sum $XSS_{k+1}$ for the $k+1^{th}$ iteration once $XSS_k$ for the $k^{th}$ iteration is known. Equation 421 removes contributions of $(x_r, y_r)$ from $XSS_k$ mathematically and adds contributions of $(x_a, y_a)$ to $XSS_k$ mathematically to get $XSS_{k+1}$. Once $XS_k$ or $\bar{x}_k$ and $XSS_k$ are known, equations 422 may be used for calculating $XV_k$, and once $XS_{k+1}$ or $\bar{x}_{k+1}$ and $XSS_{k+1}$ are known, equations 423 may be used for indirectly iteratively calculating $XV_{k+1}$. Equations 422 comprise multiple equations but only one of them is needed depending on if a sum or a mean is available. Equations 423 comprise multiple equations but only one of them is needed depending on if a sum or a mean is available. Equation 424 is a traditional equation for calculating component $SXY_k=\Sum_1^n x_i y_i$ for the $k^{th}$ iteration for computation set XY. Equation 425 is a traditional equation for calculating component $SXY_{k+1}$ for the $k+1^{th}$ on modified computation set XY' where an existing pair of data elements $(x_r, y_r)$ is removed and a pair of data elements $(x_a, y_a)$ is added. Equation 426 is for directly iteratively calculating component $SXY_{k+1}$ for the $k+1^{th}$ on modified computation set XY' where an existing pair of data elements $(x_r, y_r)$ is removed and a pair of data elements $(x_a, y_a)$ is added assuming component $SXY_k$ for the $k^{th}$ iteration is known. Equation 426 removes contributions of $(x_r, y_r)$ from $SXY_k$ mathematically and adds contributions of $(x_a, y_a)$ to $SXY_k$ mathematically to get $SXY_{k+1}$. Equations 427 may be used for indirectly iteratively calculating simple linear regression coefficient $b1_{k+1}$ for the $k+1^{th}$ iteration once components $XS_{k+1}$ and/or $\bar{x}_{k+1}$, $YS_{k+1}$ and/or $\bar{y}_{k+1}$, $XV_{k+1}$, and $SXY_{k+1}$ are calculated. Equations 427 comprise multiple equations but only one of them is needed depending on if a sum or a mean or both are available. Equation 428 may be used for indirectly iteratively calculating simple linear regression coefficient $b0_{k+1}$ for the $k+1^{th}$ iteration once components $XS_{k+1}$ and/or $\bar{x}_{k+1}$, $YS_{k+1}$ and/or $\bar{y}_{k+1}$, and $b1_{k+1}$ are calculated. Equations 428 comprise multiple equations but only one of them is needed depending on if a sum or a mean or both are available for variable X and variable Y respectively.

FIG. 4D illustrates the second example iterative simple linear regression coefficient calculation algorithm (iterative algorithm 2) for iteratively calculating simple linear regression coefficients based on iteratively calculated components $XS_{k+1}$ and/or $\bar{x}_{k+1}$, $YS_{k+1}$ and/or $\bar{y}_{k+1}$, $SSDX_k$, and $SDXY_k$. Equation 415 and equation 416 may be used for directly iteratively calculating sum $XS_{k+1}$ and sum $YS_{k+1}$ for the $k+1^{th}$ iteration based on sum $XS_k$ and sum $YS_k$ known for the $k^{th}$ iteration respectively. Equation 417 and equation 418 may be used for directly iteratively calculating mean $\bar{x}_{k+1}$ for X variable and mean $\bar{y}_{k+1}$ for X variable for the $k+1^{th}$ iteration based on mean $\bar{x}_k$ and mean $\bar{y}_k$ known for the $k^{th}$ iteration respectively. Equation 429 is a traditional equation for calculating component $SSDX_k=\Sum_1^n(x_i-\bar{x}_k)^2$ for the $k^{th}$ iteration on computation set XY assuming $\bar{x}_y$ is known. Equation 430 is a traditional equation for calculating $SSDX_{k+1}$ for the $k+1^{th}$ iteration on modified computation set XY' where an existing pair of data elements $(x_r, y_r)$ is removed and a pair of data elements $(x_a, y_a)$ is added assuming $\bar{x}_{k+1}$ is known. Equations 431 are for directly iteratively calculating $SSDX_{k+1}$ for the $k+1^{th}$ on modified computation set XY' where an existing pair of data elements $(x_r, y_r)$ is removed and a pair of data elements $(x_a, y_a)$ is added assuming $SSDX_k$ for the $k^{th}$ iteration is known. Equations 431 remove contributions of $(x_r, y_r)$ from $SSDX_k$ mathematically and add contributions of $(x_a, y_a)$ to $SSDX_k$ mathematically to get $SSDX_{k+1}$. Equations 431 comprise multiple equations but only one of them is needed depending on if a sum or a mean or both are available for variable X. Equation 432 is a traditional equation for calculating component $SDXY_k=\Sum_1^n(x_i-\bar{x}_k)(y_i-\bar{y}_k)$ for the $k^{th}$ iteration for computation set XY assuming $\bar{x}_y$ and $\bar{y}_k$ are known. Equation 433 is a traditional equation for calculating component $SDXY_{k+1}$ for the $k+1^{th}$ iteration for modified computation set XY' where an existing pair of data elements $(x_r, y_r)$ is removed and a pair of data elements $(x_a, y_a)$ is added assuming components $\bar{x}_{k+1}$ and $\bar{y}_{k+1}$ are known. Equations 434 are for directly iteratively calculating component $SDXY_{k+1}$ for the $k+1^{th}$ iteration for modified computation set XY' where an existing pair of data elements $(x_r, y_r)$ is removed and a pair of data elements $(x_a, y_a)$ is added assuming components $\bar{x}_{k+1}$, $\bar{y}_{k+1}$ and $SDXY_k$ are known. Equations 434 remove contributions of $(x_r, y_r)$ from $SDXY_k$ mathematically and add contributions of $(x_a, y_a)$ to component $SDXY_k$ mathematically to get component $SDXY_{k+1}$. Equations 434 comprise multiple equations but only one of them is needed depending on if a sum or a mean or both are available for variable X and variable Y respectively. Equation 435 is for indirectly iteratively calculating simple linear regression coefficient $b1_{k+1}$ for the k+1$^{th}$ iteration for computation set XY' once components $SSDX_{k+1}$, and $SDXY_{k+1}$ are calculated. Equation 436 may be used for indirectly iteratively calculating simple linear regression coefficient $b0_{k+1}$ for the k+1$^{th}$ iteration once components $XS_{k+1}$ and/or $\bar{x}_{k+1}$, $YS_{k+1}$ and/or $\bar{y}_{k+1}$, and $b1_{k+1}$ are calculated. Equations 436 comprise multiple equations but only one of them is needed depending on if a sum or a mean or both are available for variable X and variable Y respectively.

FIG. 4E illustrates the third example iterative simple linear regression coefficient calculation algorithm (iterative algorithm 3) for iteratively calculating simple linear regression coefficients based on iteratively calculated components $XS_{k+1}$ or $\bar{x}_{k+1}$, $YS_{k+1}$ or $\bar{y}_{k+1}$, $XSS_{k+1}$, and $SXY_{k+1}$. Equation 415 and equation 416 may be used for directly iteratively calculating sum $XS_{k+1}$ and sum $YS_{k+1}$ for the k+1$^{th}$ iteration based on sum $XS_k$ and sum $YS_k$ known for the k$^{th}$ iteration respectively. Equation 417 and equation 418 may be used for directly iteratively calculating mean $\bar{x}_{k+1}$ and mean $\bar{y}_{k+1}$ for the k+1$^{th}$ iteration based on mean $\bar{x}_k$ and mean $\bar{y}_k$ known for the k$^{th}$ iteration respectively. Equation 437 is a traditional equation for calculating component $XSS_k = \Sigma_1^n x_i^2$ for the k$^{th}$ iteration for computation set XY. Equation 438 is a traditional equation for calculating component $XSS_{k+1}$ for the k+1$^{th}$ iteration for modified computation set XY' where an existing pair of data elements $(x_r, y_r)$ is removed and a pair of data elements $(x_a, y_a)$ is added assuming $\bar{x}_{k+1}$ is known. Equation 439 is an equation for directly iteratively calculating component $XSS_{k+1}$ for the k+1$^{th}$ for modified computation set XY' where an existing pair of data elements $(x_r, y_r)$ is removed and a pair of data elements $(x_a, y_a)$ is added assuming component $XSS_k$ for the k$^{th}$ iteration is known. Equation 439 removes contributions of $(x_r, y_r)$ from $XSS_k$ mathematically and adds contributions of $(x_a, y_a)$ to component $XSS_k$ mathematically to get component $XSS_{k+1}$. Equation 440 is a traditional equation for calculating component $SXY_k = \Sigma_1^n x_i y_i$ for the k$^{th}$ iteration for computation set XY. Equation 441 is a traditional equation for calculating component $SXY_{k+1}$ for the k+1$^{th}$ iteration for modified computation set XY' where an existing pair of data elements $(x_r, y_r)$ is removed and a pair of data element $(x_a, y_a)$ is added. Equation 442 is an equation for directly iteratively calculating component $SXY_{k+1}$ for the k+1$^{th}$ iteration on modified computation set XY' where an existing pair of data elements $(x_r, y_r)$ is removed and a new pair of data element $(x_a, y_a)$ is added assuming component $SXY_k$ is known. Equation 442 removes contributions of $(x_r, y_r)$ from $SXY_k$ mathematically and adds contributions of $(x_a, y_a)$ to $SXY_k$ mathematically to get $SXY_{k+1}$. Equations 443 are for indirectly iteratively performing simple linear regression $b1_{k+1}$ for the k+1$^{th}$ iteration for computation set XY' once components $XS_{k+1}$ or $\bar{x}_{k+1}$, $YS_{k+1}$ or $\bar{y}_{k+1}$, $XSS_{k+1}$, and $SXY_{k+1}$ are calculated. Equations 443 comprise multiple equations but only one of them is needed depending on if a sum or a mean or both are available. Equation 444 may be used for indirectly iteratively calculating simple linear regression coefficient $b0_{k+1}$ for the k+1$^{th}$ iteration once components $XS_{k+1}$ and/or $\bar{x}_{k+1}$, $YS_{k+1}$ and/or $\bar{y}_{k+1}$, and $b1_{k+1}$ are calculated. Equations 444 comprise multiple equations but only one of them is needed depending on if a sum or a mean or both are available for variable X and variable Y respectively.

FIG. 5A illustrates an example of calculating simple linear regression coefficients for XY Big Data Set 501 using traditional algorithms. The data elements of XY computation set 503 come from XY Big Data Set 501. XY computation set size 502 (n) is 4. Firstly, mean $\bar{x}_1$ for X variable and mean $\bar{y}_1$ for Y variable are calculated for XY computation set. Then, $\Sigma_1^4 (x_i - \bar{x}_1)(y_i - \bar{y}_1)$ and $\Sigma_1^4 (x_i - \bar{x}_1)^2$ are calculated based on each data elements in the computation set and $\bar{x}_1$ and $\bar{y}_1$. Finally, simple linear regression coefficients $b1_1$ and $b0_1$ are calculated. For example, for X variable in XY computation set 505 mean $\bar{x}_1$ is calculated to be 4.5. Calculating mean $\bar{x}_1$ includes 1 division operation and 3 addition operations. Similarly, for Y variable in XY computation set 506 mean $\bar{y}_1$ is calculated to be 5. Calculating mean $\bar{y}_1$ includes 1 division operation and 3 addition operations. Then, $\Sigma_1^4 (x_i - \bar{x}_1)(y_i - \bar{y}_1)$ is calculated to be 22 based on $\bar{x}_1$ and $\bar{y}_1$ and the data elements in XY computation set 503. Calculating $\Sigma_1^4 (x_i - \bar{x}_1)(y_i - \bar{y}_1)$ includes 4 multiplications, 3 additions and 8 subtractions. $\Sigma_1^4 (x_i - \bar{x}_1)^2$ is calculated to be 29 based on $\bar{x}_1$ and the data elements in XY computation set 503. Calculating $\Sigma_1^4 (x_i - \bar{x}_1)^2$ includes 4 multiplications, 3 additions and 4 subtractions. Finally, simple linear regression coefficient $b1_1$ is calculated to be 0.7586206896551724 based on the computing results of $\Sigma_1^4 (x_i - \bar{x}_1)(y_i - \bar{y}_1)$ and $\Sigma_1^4 (x_i - \bar{x}_1)^2$, and simple linear regression coefficient $b0_1$ is calculated to be 1.5862068965517241 based on components $\bar{x}_1$, $\bar{y}_1$, and $b1_1$. Calculating $b1_1$ includes 1 division. Calculating $b0_1$ includes 1 multiplication and 1 subtraction. Thus, there is a total of 3 divisions, 9 multiplications, 12 additions and 13 subtractions when calculating said simple linear regression.

The data elements of XY computation set 504 come from XY Big Data Set 501. XY computation set 504 comprises the data elements in XY computation set 503 but has removed an existing pair of data elements $(x_r, y_r)$ and added a pair of data elements $(x_a, y_a)$. The computation set size stays the same. XY computation set size 502 (n) is 4.

The same equations and steps used in calculating simple linear regression coefficients $b1_1$ and $b0_1$ for XY computation set 503 may be used for calculating simple linear regression coefficients $b1_2$ and $b0_2$ for XY computation set 504. Since there is no change on the computation set size, equations and steps, there are also 3 divisions, 9 multiplications, 12 additions and 13 subtractions when calculating $b1_2$ and $b0_2$. $b1_2$ is calculated to be 0.3846153846153846 and $b0_2$ is calculated to be 3.1538461538461539.

The data elements of XY computation set 505 come from XY Big Data Set 501. XY computation set 505 comprises the data elements in XY computation set 504 but has removed an existing pair of data elements $(x_r, y_r)$ and added a pair of data element $(x_a, y_a)$. The computation set size stays the same. XY computation set size 502 (n) is 4.

The same equations and steps used in calculating simple linear regression coefficients $b1_2$ and $b0_2$ for X computation set 504 may be used for calculating simple linear regression coefficients $b1_3$ and $b0_3$ for XY computation set 505. Since there is no change on the computation set size, equations and steps, there are also 3 divisions, 9 multiplications, 12 additions and 13 subtractions when calculating $b1_3$ and $b0_3$. $b1_3$ is calculated to be 0.7627118644067797, and $b0_3$ is calculated to be 1.271186440677965975.

For a computation set of n pairs of data elements, traditional algorithms typically use 3 divisions, 2n+1 multiplications, 4(n−1) additions and 3n+1 subtractions when calculating simple linear regression coefficients without any optimization.

FIG. 5B illustrates an example of calculating simple linear regression coefficients using iterative algorithm 1. A mean instead of a sum is used in the example. The calculations for calculating simple linear regression coefficients $b1_1$ and $b0_1$ for XY computation set 503 are essentially the same as using traditional algorithms shown in FIG. 5A but with additional computation for $XSS_1$ and $SXY_1$. $XSS_1$ and $SXY_1$ are prepared to be used in calculating simple linear regression coefficients $b1_2$ and $b0_2$ for the modified computation set using iterative algorithm 1. Calculating $XSS_1$ includes additionally 4 multiplications and 3 additions, and calculating $SXY_1$ includes additionally 4 multiplications and 3 additions, so there is a total of 3 divisions, 17 multiplications, 18 additions, and 13 subtractions for calculating simple linear regression coefficients $b1_1$ and $b0_1$.

However, for computation set 504, simple linear regression coefficients $b1_2$ and $b0_2$ can be iteratively calculated based on $XSS_1$ and $SXY_1$ calculated in the previous iteration. Equations 417 and 418 may be used for iteratively calculating means $x_2$ and $y_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 421 may be used for iteratively calculating $XSS_2$ using previously calculated $XSS_1$. Calculating $XSS_2$ includes 2 multiplications, 1 addition and 1 subtraction. Equations 423 may be used for iteratively calculating $XV_2$ using previously calculated $XV_1$. Calculating $XV_2$ includes 2 multiplications and 1 subtraction. Equation 426 may be used for iteratively calculating $SXY_2$ based on previously calculated $SXY_1$. Calculating $SXY_2$ includes 2 multiplications, 1 addition and 1 subtraction. Equations 427 and 428 may be used for calculating simple linear regression coefficients $b1_2$ and $b0_2$ based on the iteratively calculated $\bar{x}_2, \bar{y}_2, XV_2$ and $SXY_2$. Calculating $b1_2$ and $b0_2$ using equations 427 and 428 includes 1 division, 3 multiplications and 2 subtractions. Thus, the total operations include 3 divisions, 9 multiplications, 4 additions, and 7 subtractions for calculating simple linear regression coefficients $b1_2$ and $b0_2$. $b1_2$ is calculated to be 0.3846153846153846 by iterative algorithm 1 which is the same as the $b1_2$ calculated based on traditional algorithms (see FIG. 5A Cont'd 1). $b0_2$ is calculated to be 3.1538461538461539 by iterative algorithm 1 which is the same as the $b0_2$ calculated based on traditional algorithms (see FIG. 5A Cont'd 1).

Equations 417, 418, 422, 423, 426, 427 and 428 may also be used for iteratively calculating simple linear regression coefficients $b1_3$ and $b0_3$ for XY computation set 505. These calculations also include 3 divisions, 9 multiplications, 4 additions, and 7 subtractions for calculating simple linear regression coefficients $b1_3$ and $b0_3$. $b1_3$ is calculated to be 0.7627118644067797 by iterative algorithm 1, which is the same as the $b1_3$ calculated by traditional algorithms (see FIG. 5A Cont'd 2). $b0_3$ is calculated to be 1.271186440677965975 by iterative algorithm 1, which is the same as the $b0_3$ calculated by traditional algorithms (see FIG. 5A Cont'd 2). As such, the number of operations used by iterative simple linear regression coefficient calculation algorithm 1 is (potentially substantially) less than that used by traditional algorithms.

FIG. 5C illustrates an example of calculating simple linear regression coefficients using iterative algorithm 2. The calculations for calculating simple linear regression coefficients $b1_1$ and $b0_1$ for XY computation set 503 are not iterative because no previous computing results may be used. Equation 405 may be used for calculating mean $\bar{x}_1$ for X variable in XY computation set 503. Equation 406 may be used for calculating mean $\bar{y}_1$ for Y variable in XY computation set 503. Calculating $\bar{x}_1$ and $\bar{y}_1$ includes 2 divisions and 6 additions. Equation 429 may be used for calculating $SSDX_1$ for XY computation set 503. Calculating $SSDX_1$ includes 4 multiplications, 3 additions and 4 subtractions. Equation 432 may be used for calculating $SDXY_1$ for XY computation set 503. Calculating $SDXY_1$ includes 4 multiplications, 3 additions and 8 subtractions. Equation 435 may be used for calculating simple linear regression coefficient $b1_1$ and equation 436 for $b0_1$ once $SSDX_1$ and $SDXY_1$ are calculated. Calculating $b1_1$ and $b0_1$ using equations 435 and 436 includes 1 division, 1 multiplication and 1 subtraction. Thus, there is a total of 3 divisions, 9 multiplications, 12 additions, and 13 subtractions for calculating simple linear regression coefficients $b1_1$ and $b0_1$.

However, for XY computation set 504, simple linear regression coefficients $b1_2$ and $b0_2$ may be calculated iteratively based on $SSDX_1$ and $SDXY_1$ calculated in the previous iteration. Equations 417 and 418 may be used for iteratively calculating means $\bar{x}_2$ and $\bar{y}_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 431 may be used for iteratively calculating $SSDX_2$ using previously calculated $SSDX_1$. Calculating $SSDX_2$ includes 1 multiplication, 3 additions and 2 subtractions. Equation 434 may be used for iteratively calculating $SDXY_2$ based on previously calculated $SDXY_1$. Calculating $SDXY_2$ includes 2 multiplications, 2 additions and 4 subtractions. Equation 435 may be used for calculating simple linear regression coefficient $b1_2$ and equation 436 for $b0_2$ based on the iteratively calculated $SSDX_2$ and $SDXY_2$. Calculating $b1_2$ and $b0_2$ using equations 435 and 436 includes 1 division, 1 multiplication and 1 subtraction. Thus, the total operations include 3 divisions, 4 multiplications, 7 additions, and 9 subtractions for calculating simple linear regression coefficients $b1_2$ and $b0_2$. $b1_2$ is calculated to be 0.3846153846153846 by iterative algorithm 2, which is the same as the $b1_2$ calculated based on traditional algorithms (see FIG. 5A Cont'd 1). $b0_2$ is calculated to be 3.1538461538461539 by iterative algorithm 2, which is the same as the $b0_2$ calculated based on traditional algorithms (see FIG. 5A Cont'd 1).

Equations 417, 418, 431, 434, 435 and 436 may also be used for iteratively calculating simple linear regression coefficients $b1_3$ and $b0_3$ for XY computation set 505. These calculations also include 3 divisions, 4 multiplications, 7 additions, and 9 subtractions for calculating simple linear regression coefficients $b1_3$ and $b0_3$. $b1_3$ is calculated to be 0.7627118644067797 by iterative algorithm 2, which is the same as the $b1_3$ calculated by traditional algorithms (see FIG. 5A Cont'd 2). $b0_3$ is calculated to be 1.271186440677965975 by iterative algorithm 2, which is the same as the $b0_3$ calculated by traditional algorithms (see FIG. 5A Cont'd 2). As such, the number of operations used by iterative algorithm 2 is (potentially substantially) less than that used by traditional algorithms.

FIG. 5D illustrates an example of calculating simple linear regression coefficients using iterative algorithm 3. The calculations for calculating simple linear regression coefficients $b1_1$ and $b0_1$ for XY computation set 503 are not iterative because no previous computing results may be used. Equation 405 may be used for calculating mean $\bar{x}_1$ for X variable in XY computation set 505. Equation 406 may be used for calculating mean $\bar{y}_1$ for Y variable in XY computation set 506. Calculating $\bar{x}_1$ and $\bar{y}_1$ includes 2 divisions and 6 additions. Equation 437 may be used for calculating $XSS_1$ for XY computation set 503. Calculating $XSS_1$ includes 4 multiplications and 3 additions. Equation 440 may be used for calculating $SXY_1$ for XY computation set 503. Calculating $SXY_1$ includes 4 multiplications and 3 additions. Equations 443 and 444 may be used for calculating simple linear regression coefficients $b1_1$ and $b0_1$ once $\bar{x}_1, \bar{y}_1, XSS_1$ and $SXY_1$ are calculated. Calculating $b1_1$ and $b0_1$ using equations 443 and 444 includes 1 division, 4 multiplications and 3 subtractions. Thus, there is a total of 3 divisions, 12 multiplications, 12 additions, and 3 subtractions for calculating simple linear regression coefficients $b1_1$ and $b0_1$.

However, for XY computation set 504, simple linear regression coefficients $b1_2$ and $b0_2$ can be calculated iteratively based on $\bar{x}_1$, $\bar{y}_1$, $XSS_1$ and $SXY_1$ calculated in the previous iteration. Equations 417 and 418 may be used for iteratively calculating means $\bar{x}_2$ and $\bar{y}_2$ using previously calculated $\bar{x}_1$ and $\bar{y}_1$ respectively. Calculating $\bar{x}_2$ and $\bar{y}_2$ includes 2 divisions, 2 additions and 2 subtractions. Equation 439 may be used for iteratively calculating $XSS_2$ using previously calculated $XSS_1$. Calculating $XSS_1$ includes 2 multiplications, 1 addition and 1 subtraction. Equations 442 may be used for iteratively calculating $SXY_2$ based on previously calculated $SXY_1$. Calculating $SXY_2$ includes 2 multiplications, 1 addition and 1 subtraction. Equation 443 may be used for calculating simple linear regression coefficient $b1_2$ and equation 444 for $b0_2$ based on the iteratively calculated $\bar{x}_2$, $\bar{y}_2$, $XSS_2$, and $SXY_2$. Calculating $b1_2$ and $b0_2$ using equations 443 and 444 includes 1 division, 4 multiplications, and 3 subtractions. Thus, the total operations include 3 divisions, 8 multiplications, 4 additions, and 7 subtractions for calculating simple linear regression coefficients $b1_2$ and $b0_2$. $b1_2$ is calculated to be 0.3846153846153846 by iterative algorithm 3, which is the same as the $b1_2$ calculated based on traditional algorithms (see FIG. 5A Cont'd 1). $b0_2$ is calculated to be 3.1538461538461539 by iterative algorithm 3, which is the same as the $b0_2$ calculated based on traditional algorithms (see FIG. 5A Cont'd 1).

Equations 417, 418, 439, 442, 443 and 444 may also be used for iteratively calculating simple linear regression coefficients $b1_3$ for XY computation set 505. These calculations also include 3 divisions, 8 multiplications, 4 additions, and 7 subtractions for calculating simple linear regression coefficients $b1_3$ and $b0_3$. $b1_3$ is calculated to be 0.7627118644067797 by iterative algorithm 3, which is the same as the $b1_3$ calculated by traditional algorithms (see FIG. 5A Cont'd 2). $b0_3$ is calculated to be 1.271186440677965975 by iterative algorithm 3, which is the same as the $b0_3$ calculated by traditional algorithms (see FIG. 5A Cont'd 2). As such, the number of operations used by sample algorithm 3 is (potentially substantially) less than that used by traditional algorithms.

FIG. 6 illustrates computational loads for traditional algorithms and iterative algorithms for n=4. As depicted, there is no much difference on the numbers of division, multiplication, addition, and subtraction operations using any one of the iterative algorithms compared to the traditional algorithms.

FIG. 7 illustrates computational loads for traditional algorithms and iterative algorithms for n=1,000,000. As depicted, there are substantially fewer multiplication, addition, and subtraction operations using any one of the iterative algorithms than using traditional algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computing-device-based computing system, the computing-device-based computing system comprising one or more computing devices, each of the one or more computing devices comprising one or more processors, the computing-device-based computing system comprising one or more storage media, the one or more storage media having stored one or two data sets, a computing-system-implemented method for calculating simple linear regression coefficients for a modified computation set of a specified number of pairs of data elements of the one or two data sets, each of said pairs of data elements containing an observation of an independent variable and an observation of a dependent variable, the method comprising:

initializing, by the computing-device-based computing system, a sum or a mean or both for each variable, and one or more components of simple linear regression coefficients other than a sum and a mean for a pre-modified computation set with a specified size n (n≥6) of one or two data sets on the one or more storage media;

accessing, by the computing-device-based computing system, a pair of data elements to be removed from the pre-modified computation set and a pair of data elements to be added to the pre-modified computation set;

modifying, by the computing-device-based computing system, the pre-modified computation set by removing the to be removed pair of data elements from the pre-modified computation set and adding the to-be-added pair of data elements to the pre-modified computation set;

iteratively deriving, by the computing-device-based computing system, a sum or a mean or both for each variable in the modified computation set;

directly iteratively deriving, by the computing-device-based computing system and based at least in part on the one or more components of simple linear regression coefficients other than a sum and a mean for the pre-modified computation set, one or more components of simple linear regression coefficients other than a sum and a mean for the modified computation set, wherein directly iteratively deriving includes:

accessing the one or more components other than a sum and a mean without accessing all data elements in the modified computation set to reduce data accessing latency thereby saving computing resources and reducing the computing system's power consumption; and removing any contribution of the removed pair of data elements from each of the one or more accessed components mathematically and adding any contribution of the added pair of data elements to each of the one or more accessed components mathematically wherein not all data elements in the modified computation set are used during the directly iteratively deriving the one or more components to reduce number of operations performed by the computing system thereby increasing calculation efficiency; and generating, by the computing-device-based computing system and based on one or more of the derived components, simple linear regression coefficients for the modified computation set.

2. The computing-system-implemented method of claim 1, wherein the generating the simple linear regression coefficients further comprises indirectly iteratively deriving, by the computing-device-based computing system, one or more components, wherein the indirectly iteratively deriving of the one or more components includes individually calculating each respective one of the one or more components based on one or more components other than the respective one component.

3. The computing-system-implemented method of claim 1, wherein the accessing a pair of data elements to be removed from the pre-modified computation set and a pair of data elements to be added to the pre-modified computation set comprises:

accessing one or more of a group that includes one or more pairs of stock quotes, audio data, video data, geospatial data, web data, mobile communication data, online gaming data, banking transaction data, sensor data, and closed-captioning data to be removed from the pre-modified computation set; and accessing one or more of a group that includes one or more pairs of stock quotes, audio data, video data, geospatial data, web data, mobile communication data, online gaming data, banking transaction data, sensor data, and closed-captioning data to be added to the pre-modified computation set.

4. The computing-system-implemented method of claim 1, wherein the accessing a pair of data elements to be removed from the pre-modified computation set and a pair of data elements to be added to the pre-modified computation set includes accessing a plurality of z (z>1) pairs of data elements to be removed from the pre-modified computation set and a plurality of z (z>1) pairs of data elements to be added to the pre-modified computation set, and wherein the method further comprises performing, for each pair of the respective z pairs of data elements to be removed and each pair of the respective z pairs of data elements to be added, the modifying the pre-modified computation set, the iteratively deriving a sum or a mean or both for each variable in the modified computation set, the directly iteratively deriving the one or more components, and the generating simple linear regression coefficients for the modified computation set.

5. The computing-system-implemented method of claim 4, wherein the generating simple linear regression coefficients for the modified computation set further comprises indirectly iteratively deriving, by the computing-device-based computing system, one or more components of simple linear regression coefficients for the modified computation set, wherein the indirectly iteratively deriving the one or more components includes individually calculating each respective one of the one or more components based on one or more components other than the respective one component.

6. The computing-system-implemented method of claim 4, wherein the generating simple linear regression coefficients for the modified computation set comprises generating simple linear regression coefficients for a modified computation set only when the simple linear regression coefficients are accessed.

7. The computing-system-implemented method of claim 1, wherein the accessing a pair of data elements to be removed from the pre-modified computation set and a pair of data elements to be added to the pre-modified computation set includes accessing a plurality of z (z>1) pairs of data elements to be removed from the pre-modified computation set and a plurality of z (z>1) pairs of data elements to be added to the pre-modified computation set, and wherein the method further comprises performing, for each pair of the respective z pairs of data elements to be removed and each pair of the respective z pairs of data elements to be added, the modifying the pre-modified computation set, the iteratively deriving a sum or a mean or both for each variable in the modified computation set, and the directly iteratively deriving the one or more components for the modified computation set.

8. The computing-system-implemented method of claim 1, wherein the accessing a pair of data elements to be removed from the pre-modified computation set and a pair of data elements to be added to the pre-modified computation set consists of accessing a pair of data elements to be removed from the pre-modified computation set and a pair of data elements to be added to the pre-modified computation set only.

9. A computing system, the computing system comprising:

one or more computing devices;

each computing device comprising one or more processors;

one or more storage media comprising one or two data sets; and one or more calculation modules that, when executed by at least one of the one or more computing devices, determine simple linear regression coefficients for a specified number of pairs of data elements in a modified computation set of the one or two data sets, each of said pairs of data elements containing an observation of an independent variable and an observation of a dependent variable, wherein determination of the simple linear regression coefficients includes to:

a. initialize a sum or a mean or both for each variable, and one or more components of simple linear regression coefficients other than a sum and a mean for a pre-modified computation set of a specified size n (n≥6), wherein the pre-modified computation set contains n pairs of data elements of the one or two data sets;

b. access a pair of data elements to be removed from the pre-modified computation set and a pair of data elements to be added to the pre-modified computation set;

c. modify the pre-modified computation set, wherein modification of the pre-modified computation set includes to remove the to-be-removed pair of data elements from the pre-modified computation set and to add the to-be-added pair of data elements to the pre-modified computation set;

d. iteratively calculate a sum or a mean or both for each variable in the modified computation set;

e. directly iteratively calculate one or more components of simple linear regression coefficients other than a sum and a mean for the modified computation set based at least in part on the one or more components other than a sum and a mean for the pre-modified computation set, wherein direct iterative calculation of the one or more components includes to remove any contribution of the removed pair of data elements from each of the one or more components mathematically and to add any contribution of the added pair of data elements to each of the one or more components mathematically without accessing and using all data elements in the modified computation set in order to reduce data access latency and number of operations performed by the computing system, thereby increasing calculation efficiency, saving computing resources and reducing the computing system's power consumption; and f. generate, based on one or more of the calculated components for the modified computation set, simple linear regression coefficients for the modified computation set.

10. The computing system of claim 9, wherein the one or more calculation modules, when executed by at least one of the one or more computing devices, perform b, c, d, and e multiple times.

11. The computing system of claim 9, wherein the one or more calculation modules, when executed by at least one of the one or more computing devices, perform b, c, d, e, and f multiple times.

12. The computing system of claim 11, wherein the performing f further comprises indirectly iteratively calculating one or more components of simple linear regression coefficients for the modified computation set, wherein the indirectly iteratively calculating the one or more components includes individually calculating each respective one of the one or more components based on one or more components other than the respective one component.

13. The computing system of claim 9, wherein the accessing a pair of data elements to be removed from the pre-modified computation set and a pair of data elements to be added to the pre-modified computation set consists of accessing a pair of data elements to be removed from the pre-modified computation set and a pair of data elements to be added to the pre-modified computation set only.

14. The computing system of claim 9, wherein the generating simple linear regression coefficients for the modified computation set further comprises to indirectly iteratively calculate one or more components of simple linear regression coefficients for the modified computation set, wherein the indirectly iteratively calculating the one or more components includes individually calculating each respective one of the one or more components based on one or more components other than the respective one component.

15. A computing system program product for use at a configured computing system that comprises one or more computing devices, each of the computing devices comprising one or more processors, the computing system comprising one or more storage media, the one or more storage media comprising one or two data sets, the computing system program product for implementing a method for generating simple linear regression coefficients for a specified number of pairs of data elements in a modified computation set of the one or two data sets, each of said pairs of data elements containing an observation of an independent variable and an observation of a dependent variable, the computing system program product comprising one or more non-transitory computing-device-readable storage media having stored thereon computing-device-executable instructions that, when executed by at least one of the one or more computing devices, cause the configured computing system to perform the method, the method including to:
  initialize, by the configured computing system, a sum or a mean or both for each variable, and one or more components of simple linear regression coefficients other than a sum and a mean for a pre-modified computation set of a specified size n (n≥6) of one or two data sets on the one or more storage media;
  access, by the configured computing system, a pair of data elements to be removed from the pre-modified computation set and a pair of data elements to be added to the pre-modified computation set;
  modify, by the configured computing system, the pre-modified computation set by removing the to-be-removed pair of data elements from the pre-modified computation set and adding the to-be-added pair of data elements to the pre-modified computation set;
  iteratively calculate, by the configured computing system, a sum or a mean or both for the modified computation set;
  directly iteratively calculate, by the configured computing system, one or more components of simple linear regression coefficients other than a sum and a mean for the modified computation set based at least in part on the one or more components of simple linear regression coefficients other than a sum and a mean for the pre-modified computation set, wherein not all data elements in the modified computation set are accessed and used in order to reduce data access latency and number of operations performed by the computing system, thereby saving computing resources and increasing calculation efficiency, including to:
    access the one or more components other than a sum and a mean without accessing all data elements in the modified computation set to reduce data accessing latency thereby saving computing resources and reducing the configured computing system's power consumption; and
    remove any contribution of the removed pair of data elements from each of the one or more accessed components mathematically and add any contribution of the added pair of data elements to each of the one or more accessed components mathematically without using all data elements in the modified computation set in order to reduce the number of operations performed by the configured computing system thereby increasing calculation efficiency; and
  generate, by the configured computing system, simple linear regression coefficients for the modified computation set based on one or more of the calculated components.

16. The computing system program product of claim 15, wherein the generating simple linear regression coefficients further comprises to
  indirectly iteratively calculate, by the configured computing system, one or more components for the modified computation set, wherein indirectly iteratively calculating the one or more components includes individually calculating each respective one of the one or more components based on one or more components other than the respective one component.

17. The computing system program product of claim 15, wherein the computing-device-executable instructions that, when executed, further cause the configured computing system to access a pair of data elements to be removed and a pair of data elements to be added, to modify the pre-modified computation set, to iteratively calculate a sum or a mean or both for each variable in the modified computation set, to directly iteratively calculate the one or more components other than a sum and a mean, and to generate simple linear regression coefficients for the modified computation set for each of multiple pairs of data elements to be removed from the pre-modified computation set and each of multiple pairs of data elements to the pre-modified computation set.

18. The computing system program product of claim 17, wherein the computing-device-executable instructions that, when executed, further cause the configured computing system to generate the simple linear regression coefficients comprise computing-device-executable instructions that, when executed, further cause the configured computing system to indirectly iteratively calculate one or more components of simple linear regression coefficients for the modified computation set, wherein the indirectly iteratively calculating the one or more components includes individually calculating each respective one of the one or more components based on one or more components other than the respective one component.

19. The computing system program product of claim 15, wherein the computing-device-executable instructions that, when executed, further cause the configured computing system to access a pair of data elements to be removed and a pair of data elements to be added, to modify the computation set, to iteratively calculate a sum or a mean or both for each variable in the modified computation set, to directly iteratively calculate the one or more components other than a sum and a mean for each of multiple pairs of data elements to be removed from the pre-modified computation set and each of multiple pairs of data elements to be added to the pre-modified computation set.

20. The computing system program product of claim 15, wherein the accessing a pair of data elements to be removed from the pre-modified computation set and a pair of data elements to be added to the pre-modified computation set consists of accessing a pair of data elements to be removed from the pre-modified computation set and a pair of data elements to be added to the pre-modified computation set only.

\* \* \* \* \*